Nov. 13, 1928.
R. G. RICHARDSON ET AL
1,691,410
AUTOMATIC TELEPHONE SYSTEM
Original Filed Feb. 23, 1922    10 Sheets-Sheet 1
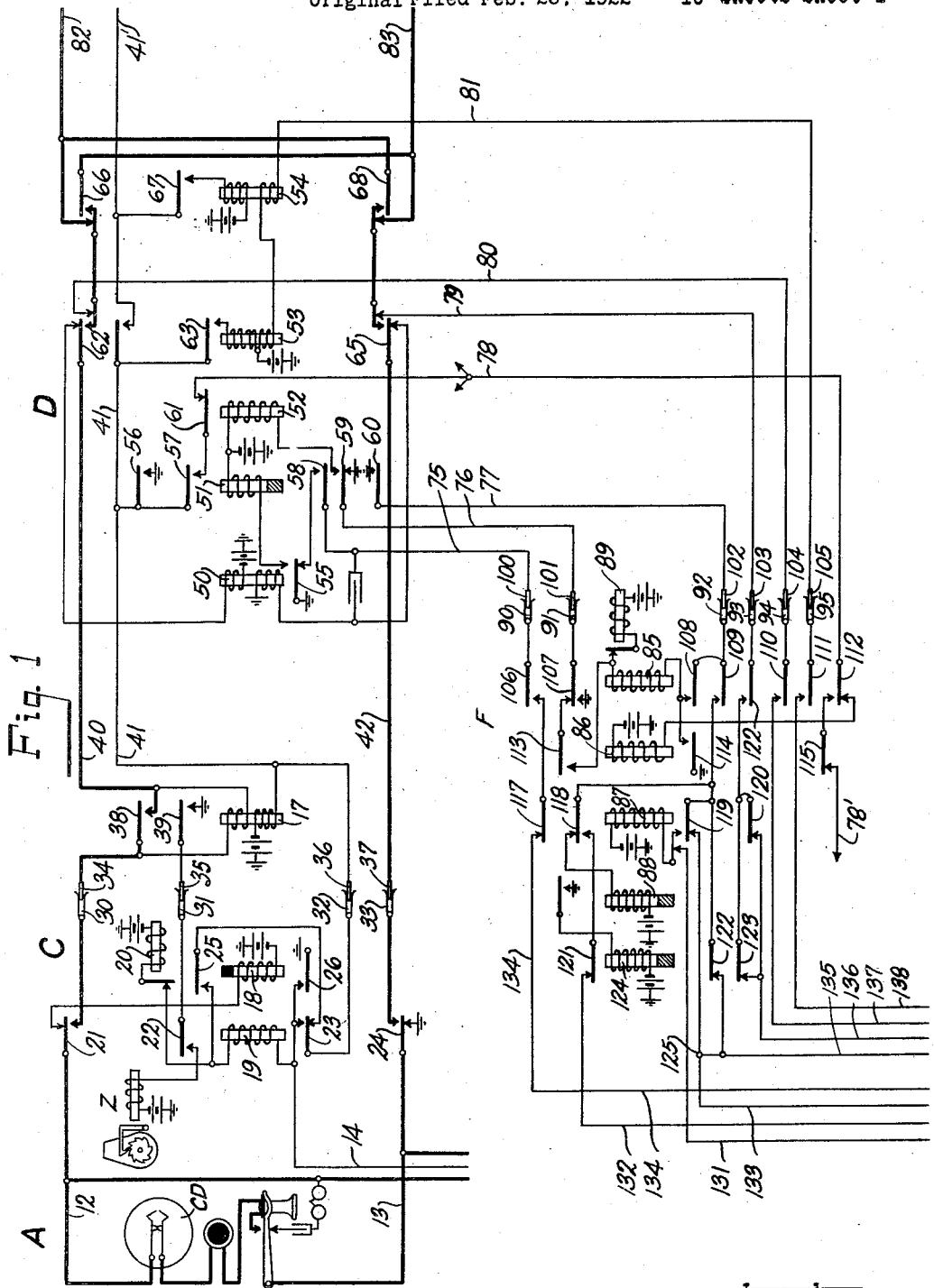

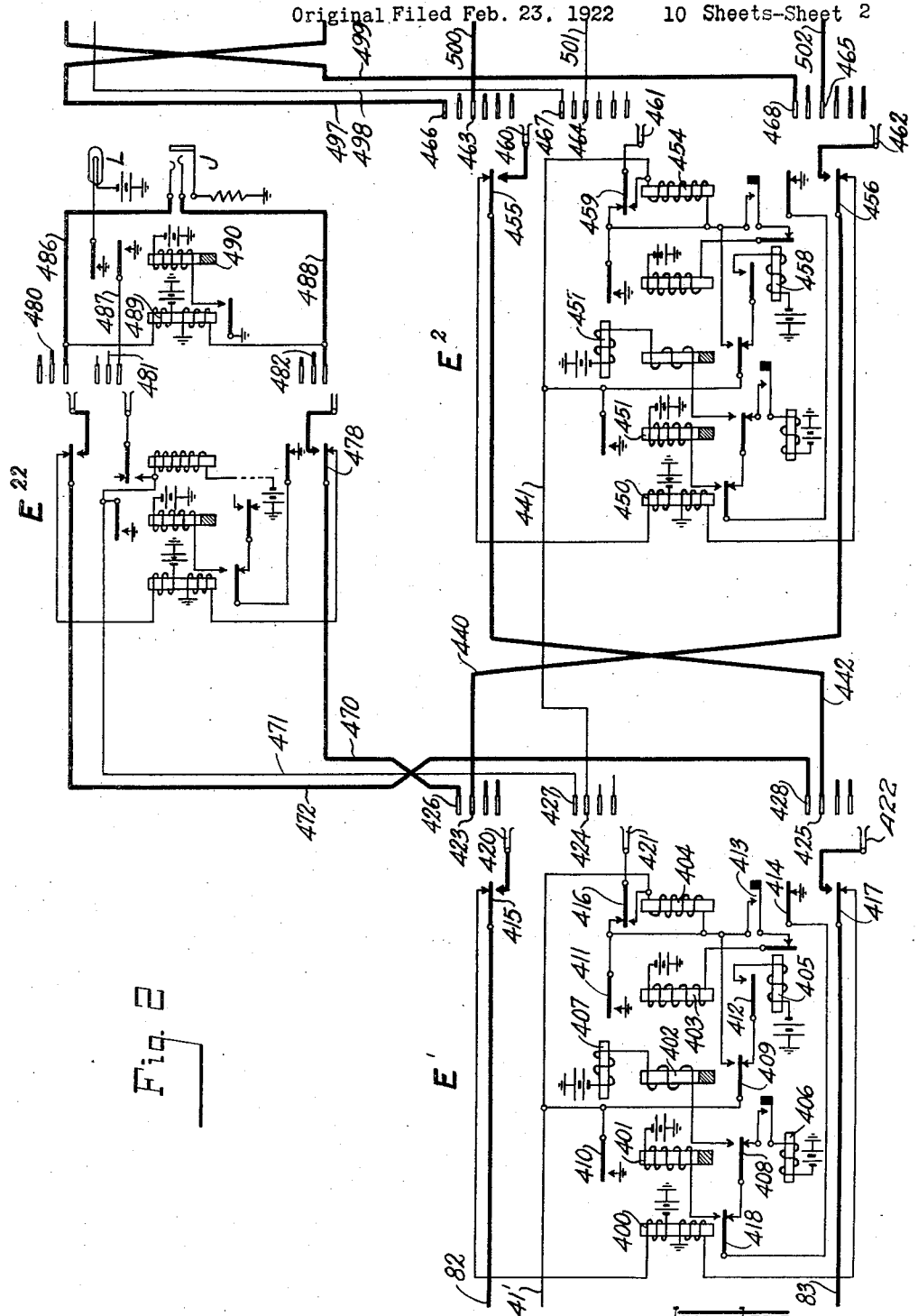

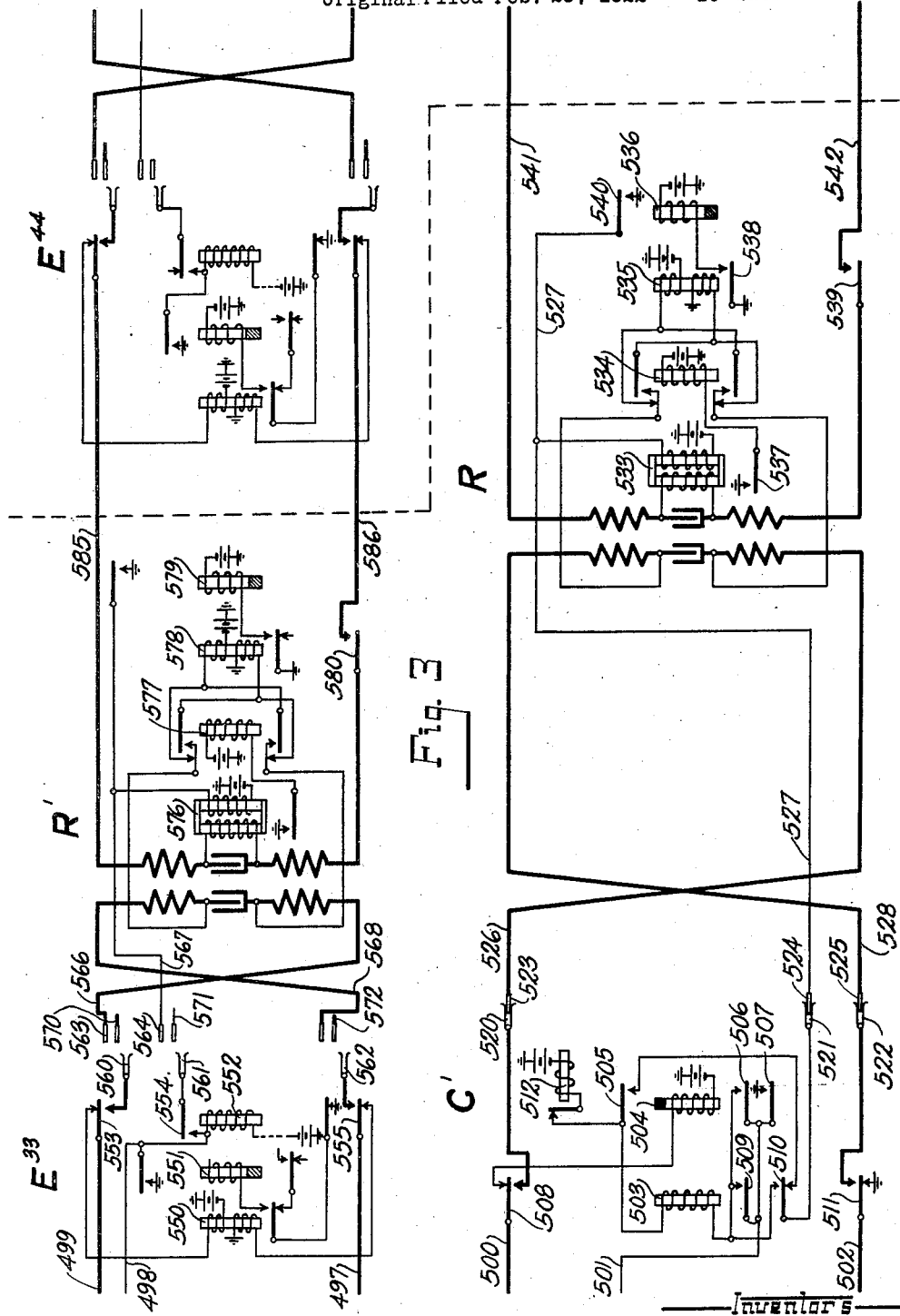

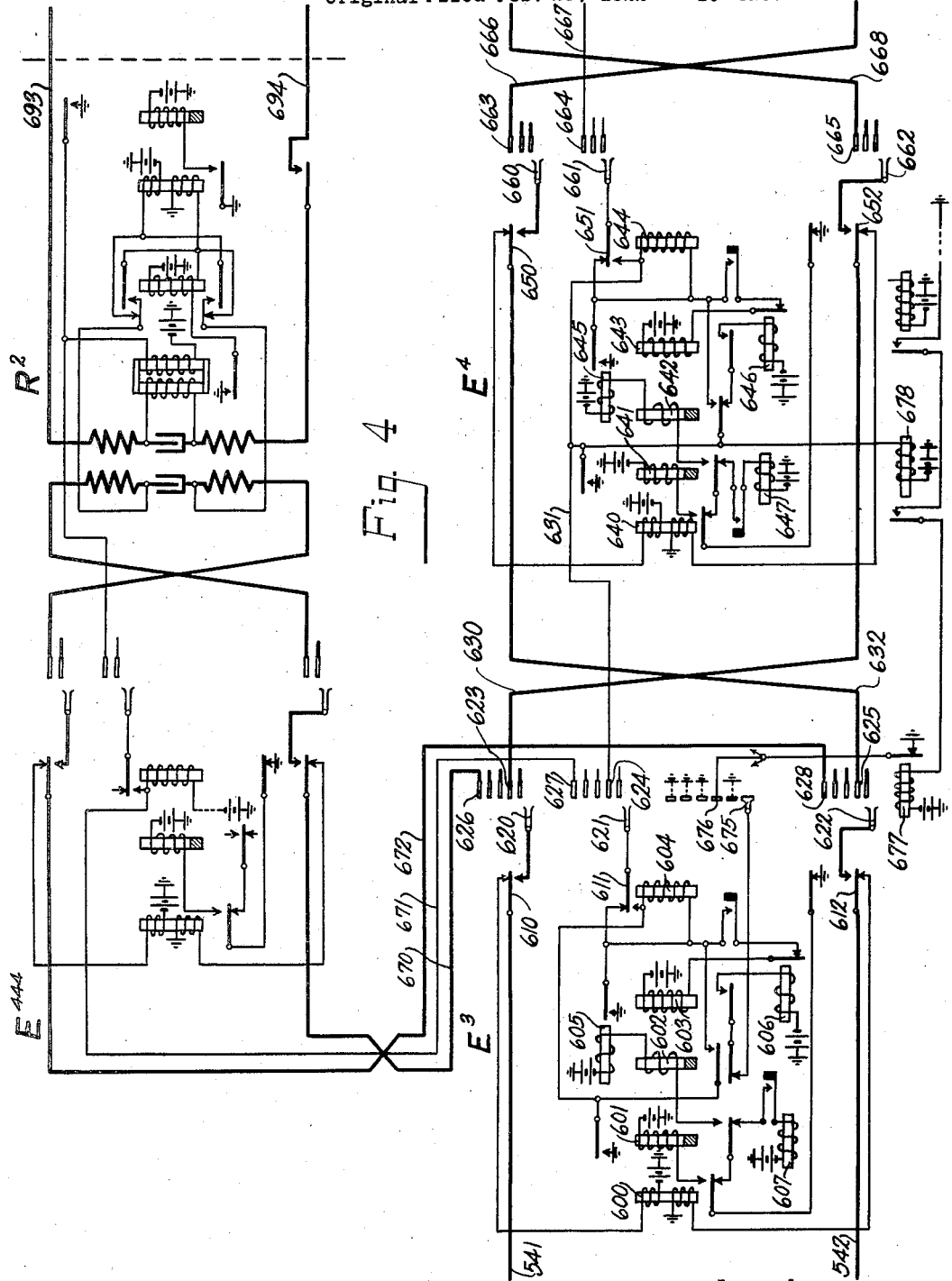

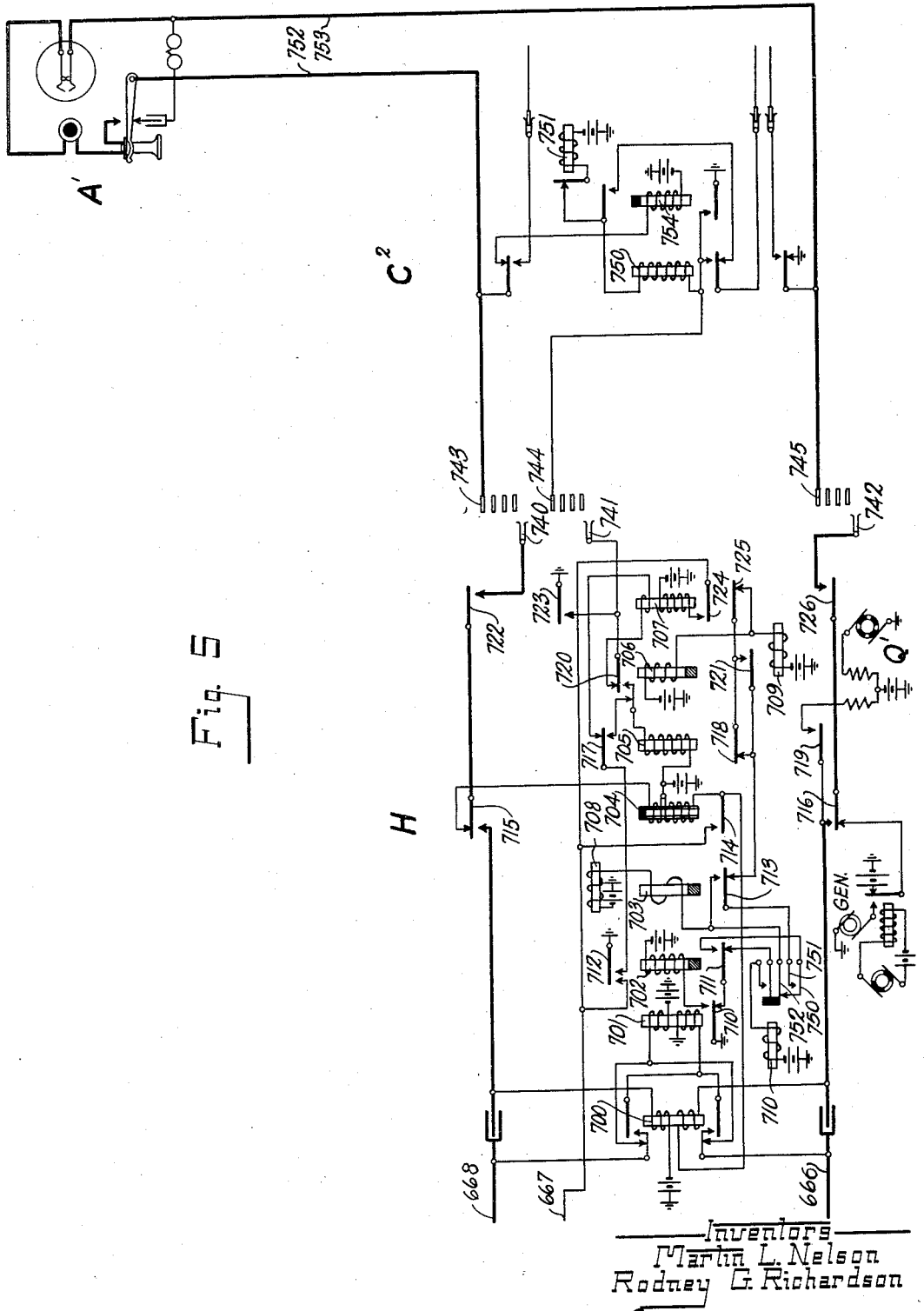

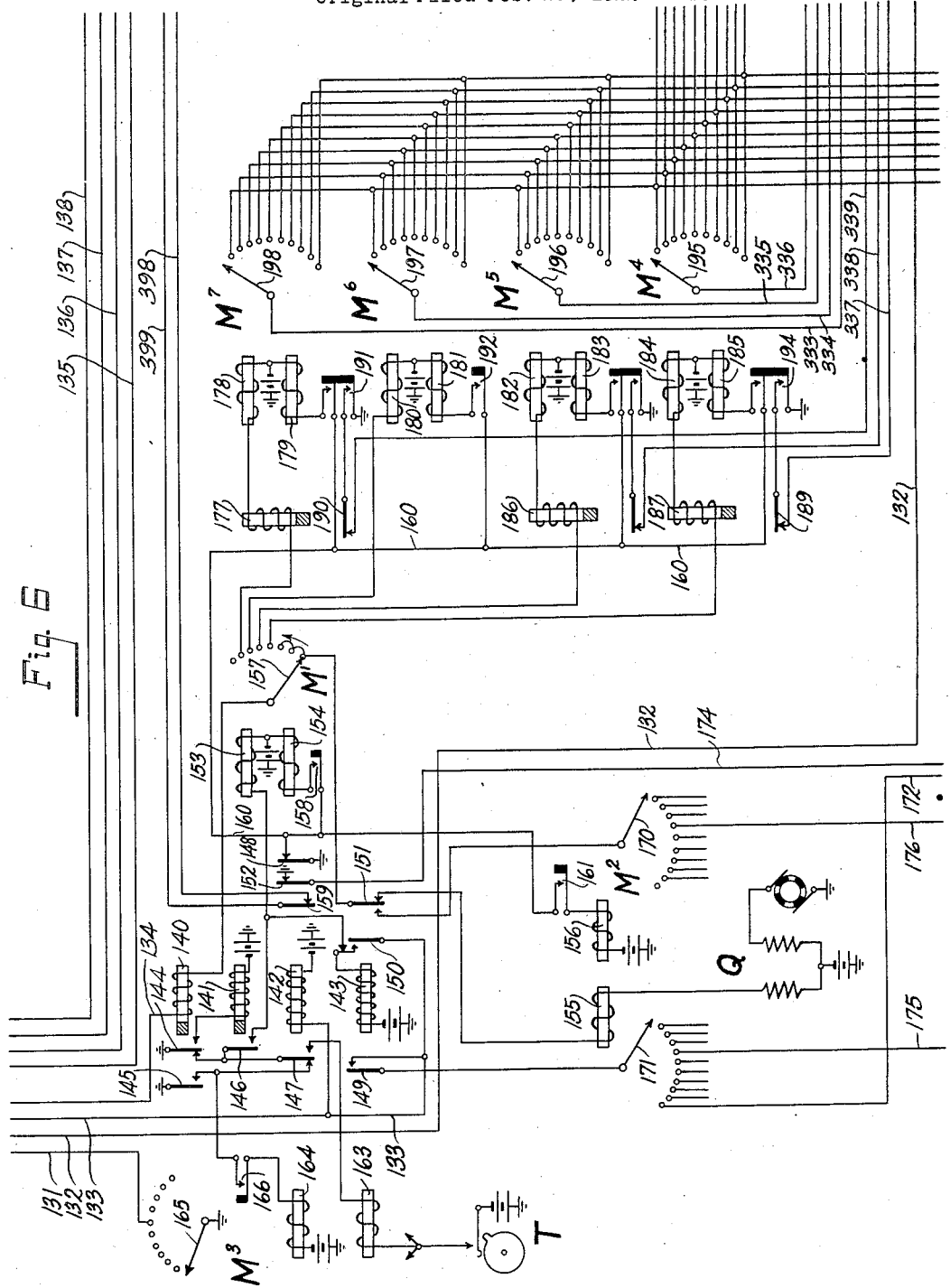

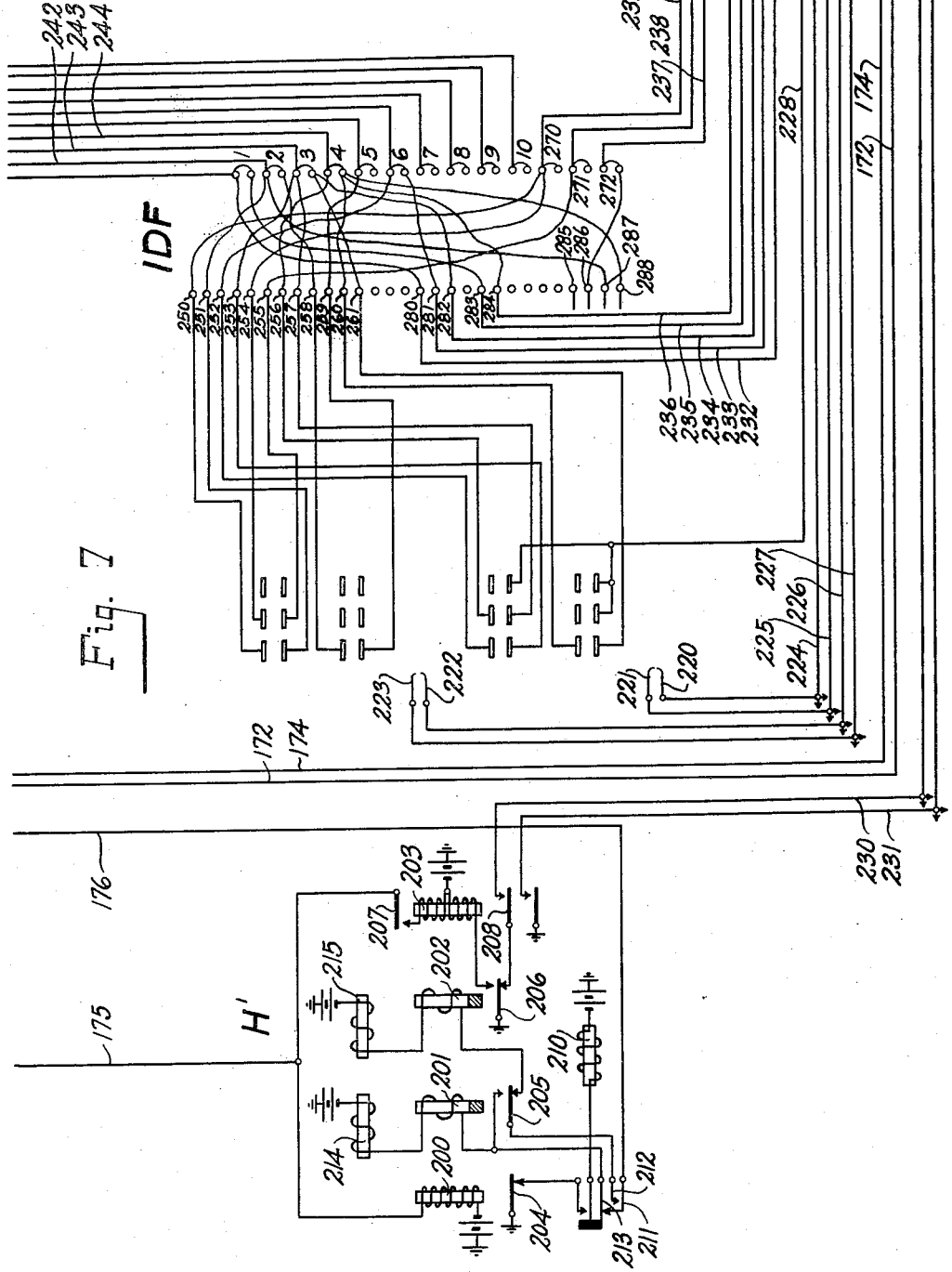

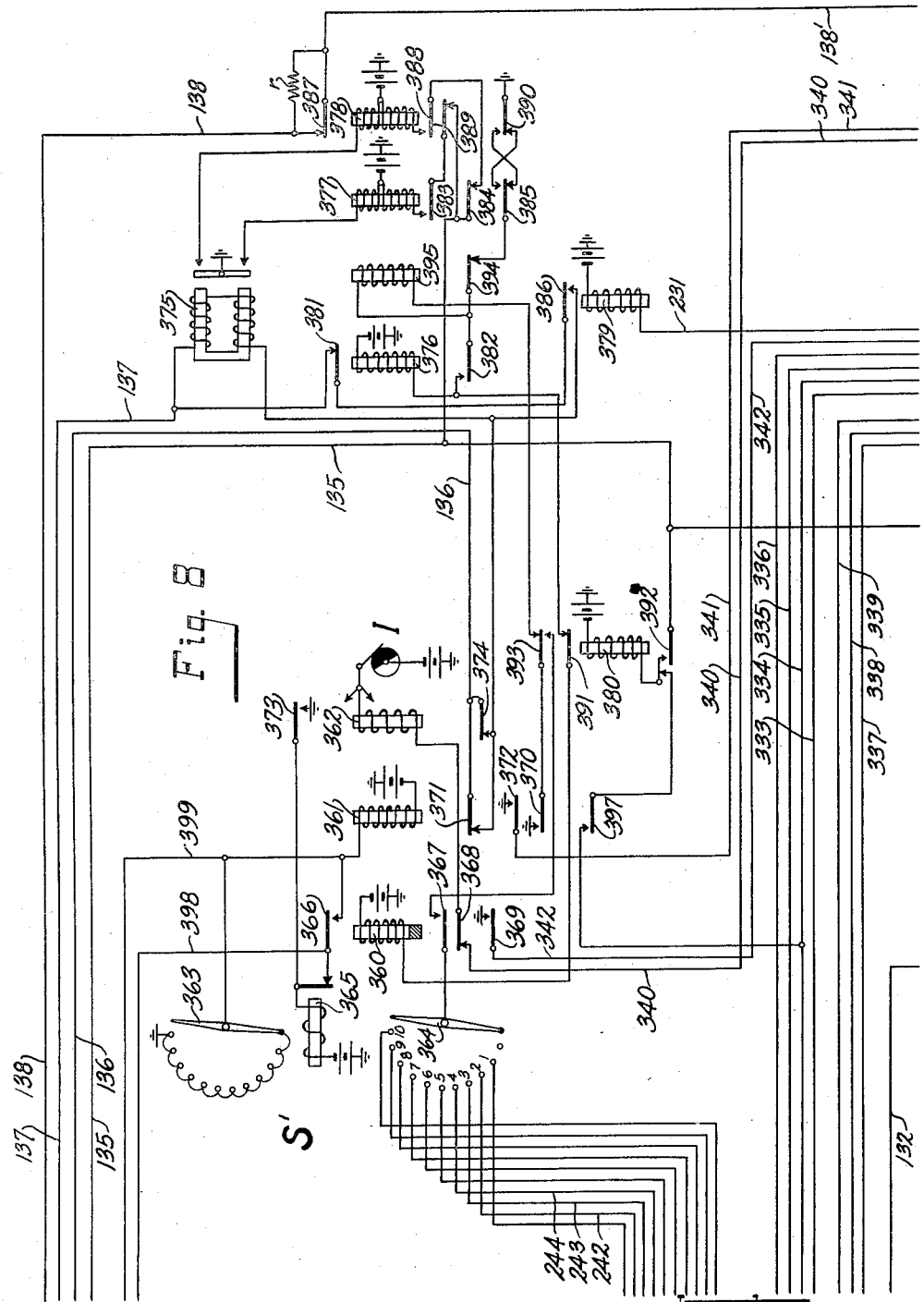

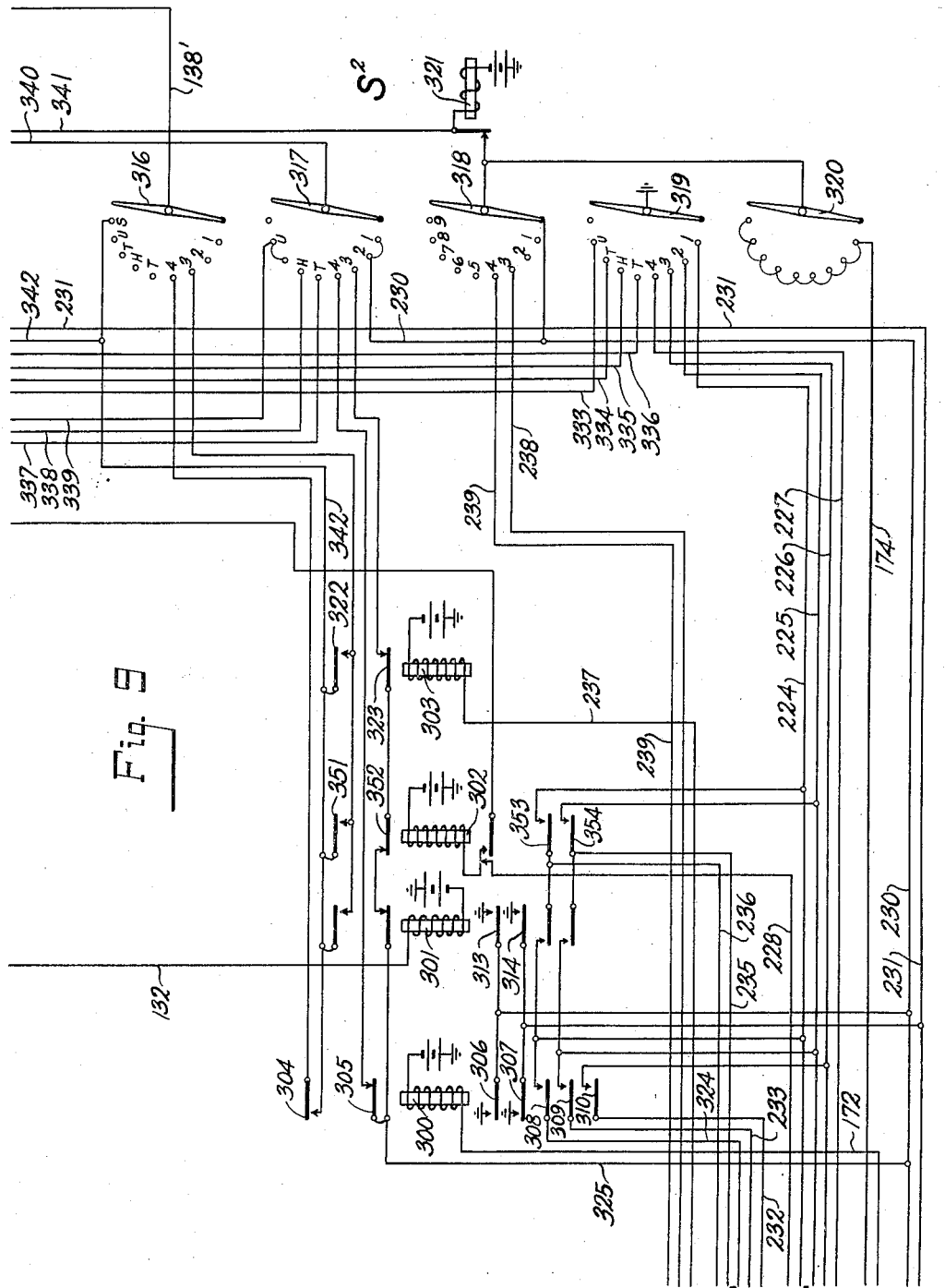

Nov. 13, 1928.  1,691,410
R. G. RICHARDSON ET AL
AUTOMATIC TELEPHONE SYSTEM
Original Filed Feb. 23, 1922    10 Sheets-Sheet 10
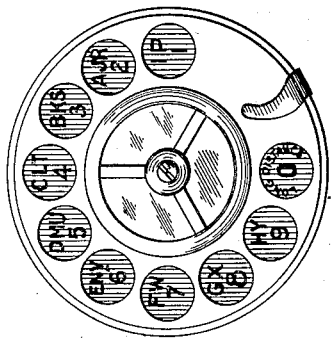
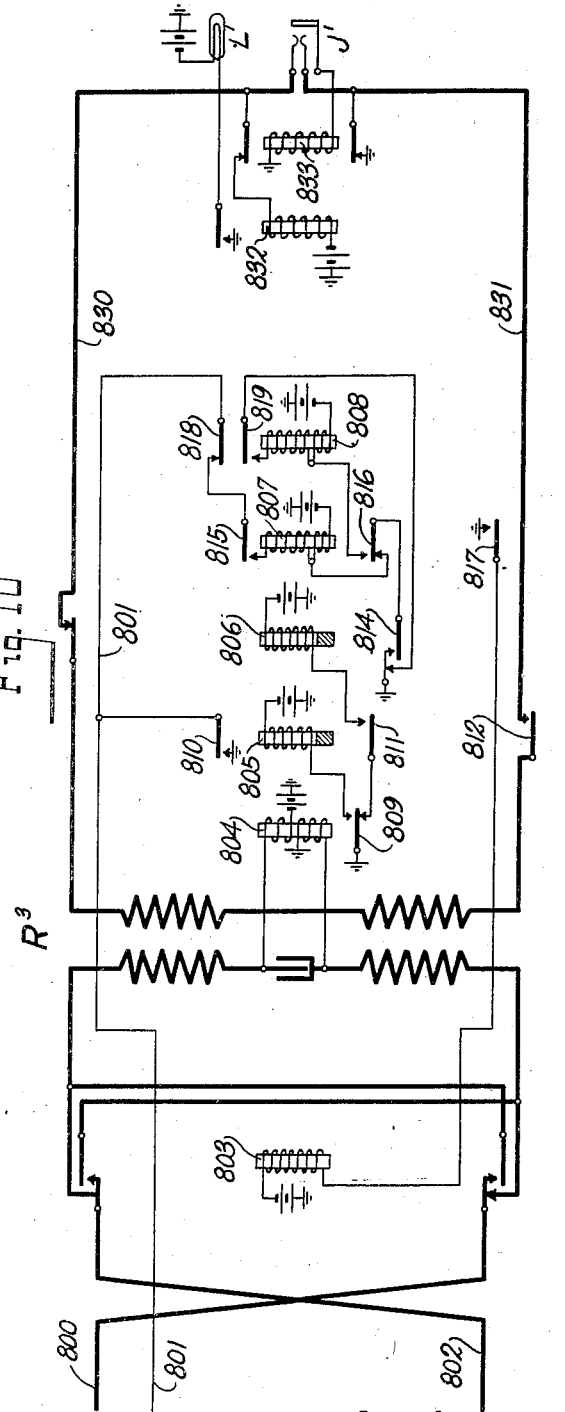
Inventors
Marlin L. Nelson
Rodney G. Richardson
Atty Patented Nov. 13, 1928.

1,691,410

UNITED STATES PATENT OFFICE.

RODNEY G. RICHARDSON, OF CHICAGO, AND MARTIN L. NELSON, OF PARK RIDGE, ILLINOIS, ASSIGNORS, BY MESNE ASSIGNMENTS, TO AUTOMATIC ELECTRIC, INC., OF CHICAGO, ILLINOIS, A CORPORATION OF DELAWARE.

AUTOMATIC TELEPHONE SYSTEM.

Original application filed February 23, 1922, Serial No. 538,551. Divided and this application filed August 6, 1928. Serial No. 297,609.

The present invention relates in general to automatic telephone systems, but more particularly to systems of the well-known Strowger or decimal type; and the general object of the invention is the provision of new and improved circuit arrangements and apparatus which enable the Strowger system to be conveniently used in large systems having complex multi-office networks.

The Strowger system has been used for large multi-office systems before this, and with considerable success, but its use under such conditions is not all that could be desired, owing to the inflexibility of the inter-office trunking, which must correspond to the directory numbering. The rigid association of the trunking with the numbering is also objectionable where existing manual networks are converted to automatic operation, for in such cases it is usually desirable to retain the old manual exchange names as part of the automatic numbering system, and the occurrence of similar names in different areas and dissimilar names in the same area renders it exceedingly difficult to arrange the trunking on an economical and efficient basis.

In order to avoid difficulties of the foregoing nature, it is proposed herein to provide registering and translating equipment in each office which is adapted to register the digits in called numbers as they are dialled, and which is adapted to translate those digits which have to do with the office selection or inter-office trunking into suitable office codes. The registering and translating devices thus make it possible to arrange the trunking between offices on the most efficient basis, and entirely without reference to the directory numbering.

The invention is illustrated in the accompanying drawings, comprising Figs. 1 to 12, inclusive, of which the first ten are circuit diagrams of the apparatus, Fig. 11 is a schematic diagram showing how the various sheets should be joined together, while Fig. 12 is a front view of the subscriber's calling device, showing the numbering of the dial.

Referring to Fig. 1, the substation A is an automatic substation of the usual type, having the usual transmitter, receiver, and ringer, and a calling device or impulse sender CD for controlling the automatic switches.

The reference character C indicates a rotary line switch, which is individual to the line of station A, and which responds automatically when the receiver is removed thereat to initiate a call to extend the line to an idle first selector. The line switch C is of the well-known rotary type, in which the wipers have no normal position and move in a forward direction only.

In common with other similar line switches the line switch C has access to a plurality of trunk lines, one of which is shown in the drawings as extending by way of the relay equipment D to the first selector $E^1$, Fig. 2. The relay equipment D is inserted in the trunk in order to provide for connecting and disconnecting a registering and translating equipment at the proper time. The first selector $E^1$ is a Strowger vertical and rotary switch of the usual type, having its bank contacts arranged in ten horizontal rows or levels. Second selectors $E^2$ and $E^{22}$, also shown in Fig. 2, are similar to the first selector $E^1$. At the right of the selector $E^{22}$ is shown a trunk line extending to an operator's position and there terminating in jack J.

The lower half of Fig. 3 shows a secondary line switch $C^1$ and a repeater R. The former is accessible to the second selector $E^2$ and other similar selectors, and in construction is similar to the primary line switch C. The repeater R is adapted to repeat automatic switch operating impulses received over the two sides of the trunk in series, and is provided with a repeating coil in lieu of the condensers which have been widely used heretofore. The upper half of Fig. 3 shows third and fourth selectors $E^{33}$ and $E^{44}$, which are similar to the selectors already described, and the repeater $R^1$, which is the same as the repeater R.

Fig. 4 shows the third selector $E^3$, and the fourth selectors $E^4$ and $E^{444}$, together with the repeater $R^2$, all of which are the same as the selectors and repeaters previously described.

Fig. 5 shows an automatic connector switch H, which is of the usual Strowger vertical and rotary type, and which is adapted to respond to two successive series of impulses in order to direct its wipers to the contacts of a particular line to which it has access, differing in this respect from the selector switches hereinbefore referred to, which respond to only one series of impulses and which have an automatic trunk hunting movement. The mechanical construction of the connector H is, however, very similar to that of the selectors. The rotary line switch C² is individual to the line of station A¹ and is similar to the line switch C, Fig. 1.

A complete set of registering and translating equipment may be called a "director" from its function of directing or routing calls to their proper destinations. One such complete equipment, or director, is shown in Figs. 6, 7, 8 and 9, and the lower half of Fig. 1. This director comprises the finder F, Fig. 1; the master digit controller M¹, Fig. 6; the A impulse register M², Fig. 6; nine Strowger switch mechanisms for registering the B and C impulses, of which one is shown at H¹, Fig. 7; the thousands register M⁴, a hundred register M⁵, a tens register M⁶, and a units register M⁷, all of which are shown in Fig. 6; an impulse sending switch S¹, Fig. 8; a sequence switch S², Fig. 9; and the intermediate distributing frame I.D.F., Fig. 7.

In the mechanical construction the finder switch F is similar to the rotary line switch C. This finder switch, together with the finders which are allotted to other directors, has access to a group of trunk lines, one of which is the trunk line shown in the drawing and extending to the first selector E¹. Assuming that the finder F has twenty-five sets of contacts in its bank, which is the usual size, there would be twenty-five trunks in the group to which the finder has access, requiring the provision of about six or seven directors to handle the traffic. It will be understood that any other convenient method of associating the directors with the trunks may be employed if desired, such for example as the scheme of providing rotary switches individual to the trunks which hunt for idle directors.

The master digit controller M¹, the A impulse register M², and the four-digit registers M⁴ to M⁷, inclusive, are simple ten-point step by step switches, each of which is provided with an operating magnet and a release magnet, and a set of off normal springs which are operated when the switch wipers are advanced out of their normal position.

The Strowger switch mechanism H¹ is the same in mechanical construction as an ordinary Strowger connector switch; that is, it has both vertical and rotary directive movements. Only sufficient relays are provided, however, to control the operating circuits for the magnets. The connector H¹ is provided with four wipers, indicated by reference characters 220 to 223, inclusive, and shown near the center of the drawing, Fig. 7, which also shows a portion of the first and second levels of the bank to which these wipers have access. Each of the other eight Strowger switch mechanisms in this particular director is also provided with four wipers, and the wipers of all the switches are connected in multiple. The banks, however, are not multipled, but each set of four contacts has a set of four individual wires which is terminated on the left hand side of the I.D.F. The drawing shows four conductors coming from the first set of contacts in the second level of the switch H¹ and terminating in the first four contacts on the I.D.F., four wires coming from the second set of contacts in the second level and terminating in the next four contacts on the I.D.F., and four wires coming from the first set of contacts in the first level and terminating in the next four contacts on the I.D.F. The bank of each Strowger switch in the director is wired up to the left hand side of the I.D.F., the same as has been explained in the case of the switch H¹; thus it will be seen that there will be four hundred wires coming from each switch, or thirty-six hundred wires in all. There are also some additional wires coming from the relays shown in Fig. 9, which will be explained hereinafter.

The right hand side of the I.D.F. consists of thirteen continuous strips or bus-bars or multipled terminals, with facilities for cross-connecting any terminal on the left hand side with any one of the thirteen bus-bars. The first ten bus-bars correspond to the ten digits, 1 to 0, inclusive, and are so marked in the drawing. These bus-bars are connected in multiple with the banks of the register switches M⁴ to M⁷, inclusive, and with the bank of the sending switch S¹, as is shown in Figs. 6 and 8. The three lower bus-bars are provided for special purposes which will be explained fully later on.

The sending switch S¹, Fig. 8, and the sequence switch S², Fig. 9, are rotary switches similar in mechanical construction to the line switch C, Fig. 1; that is, the wipers move in a forward direction only. Each of these switches, however, has a normal or home position in which it stands when at rest.

The repeater R³, Fig. 10, is not included in the main layout of the system, but is provided for a special purpose as will be pointed out hereinafter.

The invention is illustrated as applied to what is known as a 10,000,000 line system; that is, one in which each telephone number consists of seven digits or other characters. This numbering scheme provides for a maximum of one thousand 10,000 line offices, which is large enough for the very largest exchange areas. In order to assist the subscribers in remembering the telephone numbers, the first three letters of the exchange names are used in place of a corresponding number of digits, and are printed in the directory in capital letters. For example, CARlton 2345, or NORth 6789. The letters of the alphabet are, of course, marked on the subscriber's dial as well as the ten digits, as shown in Fig. 12.

The trunking between offices is along well-known lines, except that as before stated it is entirely independent of the numbering scheme. In general, each office is provided with first, second, and third selectors for selecting groups of inter-office or local trunks, and with fourth and fifth selectors and connectors for completing local connections. Then, following the general plan, each office code will consist of three digits or series of impulses, which are produced by a suitable translation from the first three letters of the exchange name, and which serve to actuate the first, second and third selectors at the originating office to select an idle trunk in the group extending to the desired distant office, or a local trunk if the called party is in the same office. In either case, the trunk selected terminates in a fourth selector in the desired office, which together with a fifth selector and connector serves to complete the connection.

It will be understood, therefore, that the general plan is to have direct trunks from each office to every other office and that these trunks are taken from the banks of the third selectors. This plan, however, need not be rigidly adhered to and, in fact, is departed from in a good many cases. For instance, if all the inter-office trunks were taken from the banks of third selectors, one-thousand groups of trunks could be had, which is much more than is required in any known case. It is estimated that not much over two-hundred offices will be required for the very largest systems, such as New York or London. In view of this, a large number of trunk groups can be taken from the banks of the second selectors to a considerable advantage. In a typical office, for example, eight levels in each of the nine groups of second selectors (the 0 level is used for Long Distance) may be used for inter-office trunks, which would give seventy-two groups of trunks, selected by a two-digit code. This would leave two levels in each group of second selectors for trunking to third selectors, providing for eighteen groups of third selectors. From the banks of the third selectors would be obtained one-hundred and eighty groups of trunks, selected by a three-digit code, which with the seventy-two groups of two-digit code trunks would make two-hundred-fifty-two groups in all.

Another departure from the general plan introduces the feature of tandem trunking, which is desirable in many cases to secure efficient trunk groups. To illustrate, a number of offices in a distant area may have four-digit codes assigned, the first three digits of which are the same. In trunking calls to any of these offices the first three digits of the code would select a main group of trunks to the tandem office, a centrally located office with respect to the others in the area in question, after which an incoming fourth selector in the tandem office would respond to the fourth digit of the code to select a group of trunks to the particular office desired. This arrangement would, of course, involve the use of fifth and sixth selectors in the offices reached by way of the tandem office, and usually in the tandem office itself, although of course in many cases the main group of trunks to the tandem office could be selected by a two-digit code instead of by a three-digit code in order to avoid the use of sixth selectors.

The foregoing will give a general idea of the type of system to which the invention is applied, sufficient to understand its operation and special uses. The drawings, of course, do not show a complete trunking system, nor is this necessary in view of the extended knowledge of the subject. It has been considered sufficient to show a typical switch train, such as may be used to establish a connection between a calling station A, Fig. 1, in the originating office and a called station A¹, Fig. 5, in a tandem office, and portions of several other switch trains, which show the routing of calls from station A to other points; all of which will afford ample opportunity to explain the operation of the director.

*Initiation of call.*

The operation of the system will now be described in detail, it being assumed for this purpose that the subscriber at station A, Fig. 1, desires to establish connection with the subscriber at station A¹, Fig. 5. When the receiver is removed at station A, a circuit is completed over the line conductors 12 and 13 for the line relay 18 of line switch C. Upon energizing, relay 18 closes a circuit for the switching relay 19 in series with the stepping magnet 20 at armature 26, and at armature 25 connects the test wiper 32 to this circuit at a point midway between the switching relay and the magnet. The operation now depends upon whether the test contact 36 with which the test wiper 32 is in engagement is grounded or not grounded. If the trunk line shown is busy, the test contact 36 will be grounded, the switching relay 19 will be short-circuited, and the stepping magnet 20 will be operated intermittently, due to the fact that it interrupts its own circuit, to advance the switch wipers step by step in search of an idle trunk line. This operation is well understood, and it may be assumed, therefore, that at the time the subscriber removes his receiver and energizes the line relay 18, the trunk line upon which the wipers of the line switch are standing is idle. Under these circumstances there will be no ground potential on test contact 36 and no rotation of the switch will take place, but instead the switching relay 19 is energized as soon as its circuit is completed. On attracting its armature 23, the switching relay disconnects the test wiper 32 from armature 25 of the line relay and connects it instead to its own lower terminal, the ground potential which is thus placed upon the test contact 36 being effective to render the trunk line busy to other calls. In addition to the foregoing, relay 19 prepares a circuit for the meter Z at armature 22, and at armatures 21 and 24 disconnects the line conductors 12 and 13 from the line relay 18 and from ground, respectively, and extends them by way of wipers 30 and 33, bank contacts 34 and 37, conductors 40 and 42, and armatures 62 and 65 of relay 53 to the upper and lower winding of the line relay 50 in the relay group D.

When the calling line is extended to the line relay 50 as previously explained, this relay is energized and at armature 55 closes a circuit for the slow-acting release relay 51. Upon energizing, relay 51 connects ground to the release trunk conductor 41 at armature 56, thereby closing a holding circuit for the line switch C, which extends by way of the said conductor 41, test contact 36, test wiper 32, armature 23 and its working contacts, winding of the switching relay 19, and the winding of the stepping magnet 20 to battery. This holding circuit is established before the slow-acting line relay 18 has had time to deenergize, and is effective to retain the line switch C in operated position throughout the connection. It will be observed that a ground potential is also placed on the private normal conductor 14 in order to render the calling line busy to incoming calls according to the well-known practice. The electro-polarized relay 17 at this time has its lower winding energized by the ground on conductor 41, while its upper winding is in series with the line relay 50. Relay 17 is so adjusted that it will not operate except from the cumulative effect of both of its windings, and since the windings are now in opposition the relay remains inoperative.

*Connecting idle director to trunk.*

Returning now to the relay group D, when relay 51 is energized, as before described, it removes ground from the test contact 101 at armature 59, and at armature 57 closes a circuit for the starting relay 86 of the finder switch F as follows: From the grounded conductor 41 by way of armature 57 and its working contact, armature 61 and its resting contact, common starting wire 78, armature 112 and its resting contact, and the winding of starting relay 86 to battery. In the foregoing it is assumed, of course, that the finder F is idle at this time. When the circuit of the starting relay 86 is completed, the said relay is energized and at armature 114 completes a circuit for the switching relay 85 in series with the stepping magnet 89, while at armature 113 the test wiper 91 is connected to the above circuit at a point between the winding of the switching relay and the interrupter contact of the stepping magnet. If the finder is not already in engagement with the set of bank contacts associated with the trunk in use, it will now commence to rotate, but on the assumption that the wipers are in the position shown in the drawing, the test wiper 91 will find no ground potential on test contact 101, the normal ground connection to this particular test contact having been removed by the energization of relay 51, and no rotation of the switch will take place. The switching relay 85, however, is immediately energized and at armature 108 completes a locking circuit for itself which extends from ground by way of armature 60 of relay 51, holding conductor 77, bank contact 102, wiper 92, armature 108 and its working contact, the winding of switching relay 85, and the winding of stepping magnet 89 to battery. At the same time that the foregoing circuit is established, ground is placed on the test wiper 91 at armature 107, thereby closing a circuit which extends by way of the said test wiper 91, test contact 101, armature 59 and its working contact, and the winding of relay 52 to battery. The closure of this circuit renders the trunk line in use busy to other finder switches by grounding test contact 101, and also energizes relay 52, which takes ground off the start wire 78 at armature 61. As a further result of the energization of relay 85, the starting wire is disconnected from the starting relay 86 of the finder switch F, and when the starting relay deenergizes is transferred by way of conductor 78' to the starting relay of the next finder switch.

As a further result of the energization of switching relay 85, a bridge is closed across the trunk conductors 82 and 83 extending to the selector E¹, Fig. 2, which may be traced from the upper trunk conductor 82 by way of contacts of relays 54 and 53, conductor 80, bank contact 104, wiper 94, armature 110 and its working contact, conductor 137, winding of polar relay 375, Fig. 8, resting contact of armature 374 and the said armature, conductor 136, resting contact of armature 120 and the said armature, working contact of armature 122 and said armature, wiper 93, bank contact 103, conductor 79, and the contacts of relays 53 and 54 to conductor 83. By the closure of the foregoing bridge, or loop, the line relay 400 of the first selector E¹ is energized and completes a circuit for the slow-acting release relay 401. Upon energizing, relay 401 grounds the release trunk conductor 41 at armature 410, and at armature 408 prepares a circuit for the vertical magnet 407. The polar relay 375 is energized in series with the line relay 400 of the selector E¹, and the direction of current flow is such that the armature of the polar relay is operated to close a circuit for relay 378. Upon energizing, relay 378 completes a locking circuit for itself which extends from ground at the relay group D by way of armature 60, conductor 77, bank contact 102, wiper 92, armature 109 and its working contact, armature 119 and its resting contact, conductor 135, armature 384 and its resting contact, armature 388 and its working contact, and the winding of relay 378 to battery. Relay 378 also removes the short-circuit from resistance $r$ at armature 387, and at armature 390 prepares a locking circuit for relays 376 and 360.

A branch of the grounded conductor 135 may be traced from junction point 125 by way of the holding conductor 133 to Fig. 6, where the release relay 142 of the master digit controller M¹ is now energized. Relay 142 removes ground from the releasing conductor 160 at armature 148, at armature 159 separate conductors 398 and 399, and at armature 147 connects up the stepping magnet 163 of the time limit switch M³. This stepping magnet is now intermittently operated under the control of the timer cam T which makes about one revolution every five seconds or more. The operation of this time limit switch will be neglected for the time being, and its function will be explained fully subsequent to the explanation of the regular circuit connection. It will be noticed also that the slow-acting relay 88 of the finder switch F is energized from the grounded holding conductor 77, and that this relay causes the energization of relay 124. The operation of these relays, however, is of no effect at the present time.

Still another result of the energization of the switching relay 85 of the finder switch F is the preparation of an impulsing circuit for operating the registers of the director. This circuit may be traced from ground by way of armature 55 of relay 50 and its resting contact (the circuit is now open at this point due to the energization of relay 50), working contact of armature 58 and the said armature, conductor 75, bank contact 100, wiper 90, armature 106 and its working contact, armature 117 and its resting contact, conductor 134, winding of low resistance slow-acting relay 140, wiper 157 of the master digit controller M¹, armature 151 and its resting contact, winding of the stepping magnet 155 of the A impulse register M², and the low resistance secondary winding of the tone transformer Q to battery. At the relay group D the above traced circuit is connected to the lower heavy talking conductor by means of a small condenser, by means of which an audible signal known as the "dial tone" is transmitted to the calling subscriber.

*Setting the A impulse register.*

Being advised by the signal thus transmitted to him that the exchange equipment is ready for operation, the calling subscriber will now proceed to operate the dial of his calling device in accordance with the three significant letters and the four digits in the number of the called station. We will assume that this number is CARlton 2345. When the dial is operated in accordance with the letter C, four interruptions are produced in the calling subscriber's line circuit in the well-known manner, and the line relay 50 of the relay group D is accordingly deenergized four times. At each deenergization relay 50 transmits an impulse of current over the previously traced impulsing circuit through the stepping magnet 155 of the A impulse switch M², and the stepping magnet is operated to advance the wipers 170 and 171 into engagement with the fourth contacts in their respective banks. The low resistance relay 140 is energized in series with the stepping magnet 155, and being slow-acting retains its armatures attracted while the entire series of four impulses is being received. At armature 144 relay 140 closes a circuit for the slow-acting relay 141, and at armature 145 it closes a circuit for the release magnet 164 of the time limit control switch M³. This latter function is mentioned in passing in order that it may be understood that in the ordinary operation of the system this switch is released before it can perform any of its functions. At the end of the series of impulses the slow-acting relay 140 deenergizes and breaks the circuit of slow-acting relay 141. During the interval between the deenergization of relay 140 and the deenergization of relay 141 an impulse of current is transmitted from ground by way of armature 144 and its resting contact, armature 146 and its working contact, and the winding of the stepping magnet 153 of the master digit control switch M¹ to battery. Stepping magnet 153 is accordingly actuated to advance the wiper 157 to its second position. A branch of the circuit of magnet 153 may be traced through the winding of relay 143 to battery, which relay, upon energizing, establishes a locking circuit for itself at armature 150. At armature 151 relay 143 disconnects the impulsing circuit from the stepping magnet 155 and transfers it by way of wiper 170 and conductor 176 to the Strowger switch H¹, Fig. 7, and at armature 149 extends the grounded holding conductor 133 by way of wiper 171 and conductor 175 to relay 200 of switch H¹. Relay 200 is accordingly energized and at armature 204 opens the circuit of the release magnet 210.

*Setting the B and C impulse registers.*

When the calling subscriber dials the next letter of the number, or the letter A, two interruptions are produced in the line circuit, and the line relay 50 deenergizes twice, thus transmitting two impulses of current over the previously traced impulsing circuit to the vertical magnet 214 of the switch H¹. The impulses come in over conductor 176 and follow a path which extends by way of off normal springs 211 and 213, winding of the slow-acting series relay 201, and the winding of the vertical magnet 214 to battery. By the operation of the vertical magnet wipers 220 to 223, inclusive, are raised two steps to a position adjacent the second level of bank contacts. Series relay 201 is energized at the same time as the vertical magnet 214, and maintains its armature 205 attracted in order to preserve the continuity of the impulsing circuit notwithstanding the shifting of the off-normal springs, which occurs on the first vertical step. At the end of the vertical movement of the switch relay 201 retracts its armature and transfers the impulsing circuit to the rotary magnet 215.

During the transmission of the second series of impulses the slow-acting series relay 140, Fig. 6, is energized the same as it was during the transmission of the first series, and by cooperation with relay 141 transmits another impulse of current to the stepping magnet 153 of the master digit control switch M¹. Wiper 157 is thus advanced to its third position.

The calling subscriber may now dial the third letter R, whereupon the line relay 50 is again caused to deenergize twice, and transmit another series of two impulses over the impulsing circuit to the switch H¹. Now, however, these impulses traverse the winding of the rotary magnet 215, and the switch wipers 220 to 223, inclusive, are rotated until they come to rest in engagement with the second set of contacts in the second level. The slow-acting series relay 202 is energized during the rotary movement of the switch and closes a circuit for relay 203, which upon energizing, establishes a locking circuit for itself at armature 207.

Immediately following the transmission of the third series of impulses the stepping magnet 153 of the master digit control switch M¹ is operated the same as before to advance the wiper 157 to its fourth position. In passing from its third to fourth position, wiper 157 transfers the impulsing circuit to the stepping magnet 184 of the thousandths register switch M⁴.

*Sending the first office code digit.*

The calling subscriber will now, of course, operate his dial in accordance with the four digits in the number, but before taking up the operation of the digit register switches, it will be advisable to consider the operation of the sending switch S¹, Fig. 8, which begins to operate as soon as the switch H¹ has completed its operation, to send out series of impulses in accordance with the office code which has been selected by the dialling of the first three letters in the called subscriber's number. When the relay 203 in the switch H¹ is energized at the beginning of the rotary movement of the switch, it closes a circuit over conductor 231 for the relay 379, Fig. 8. Upon energizing, relay 379 short-circuits the polar relay 375 at armature 386. At the end of the rotary movement of switch H¹, when the slow-acting relay 202 falls back, it places ground on conductor 230 by way of armatures 206 and 208. Conductor 230 extends to the sequence switch S², Fig. 9, where it is connected to the home or normal position contact of wiper 318, and to the first, second, third and fourth position contacts of wiper 317. It follows, therefore, that when conductor 230 is grounded a circuit will be completed through wiper 318 and through the stepping magnet 321 of the sequence switch S² to battery, and magnet 321 is accordingly operated to advance all the wipers of the sequence switch to first position. The operation will be understood fully if it is recalled that a switch of this type advances the wipers when its armature is retracted. Thus on energizing, magnet 321 attracts its armature to engage another ratchet tooth, and at the same time breaks its own circuit. On deenergizing, the retraction of the armature under the tension of its spring drives the wipers into first position, and the initial energizing circuit of magnet 321 is broken by wiper 318.

The code of the distant office in which the line of station A¹ terminates is 34, as will be perceived from an inspection of Figs. 2 and 3, which show that the trunk line comprising conductors 541 and 542 is accessible from the fourth level of the third group of second selectors in the originating office. Accordingly, the second set of contacts in the second level of the fourth Strowger switch H¹, which set of contacts is selected by the dialling of the letters CAR of the called number, is so cross connected at the I.D.F. as to cause the transmission of two series of impulses, the first series comprising three interruptions and the second series comprising four interruptions. More in detail, terminal 257 is cross connected to bus-bar 3, terminal 256 is cross connected to bus-bar 4, while terminals 255 and 254 are cross connected to bus-bars 271 and 270, respectively. These cross connections will cause the required series of impulses to be transmitted by the sending switch S¹, as will be understood shortly.

When the sequence switch wiper 319 arrives in first position, it places ground on the No. 3 bank contact associated with the stop wiper 364 of the sending switch S¹, the circuit being traceable as follows: Grounded wiper 319 in first position, conductor 224, wiper 220 of switch H¹ and bank contact engaged thereby, terminal 257 on the I.D.F., a jumper, bus-bar 3, and conductor 243 to the No. 3 contact in the lower bank of switch S¹. The grounding of this contact determines that there will be three interruptions in the first series transmitted. Wiper 317, on arriving in first position, closes a circuit for the impulsing relay 362 of the sending switch S¹ as follows: From the grounded conductor 230, by way of wiper 317 in first position, conductor 340, resting contact of armature 368 and the said armature, winding of relay 362 and the machine interrupter I to battery. The interrupter I is continuously driven, and consists of any suitable cam arrangement for intermittently connecting battery to the relays such as relay 362, at the rate of about ten times per second. When its circuit is closed, therefore, or shortly afterwards, depending on the position of the interrupter I, relay 362 is energized and opens the impulsing contact 374, this operation being of no effect, however, due to the fact that the contact at armature 374 is short-circuited at armature 371 of relay 361. Relay 362 also closes a circuit for stepping magnet 365 at armature 373, and the said magnet is energized. When the circuit of relay 362 is broken by the interrupter I an instant later the said relay falls back, again closes its interrupter contact, and breaks the circuit of the stepping magnet 365, which thereupon retracts its armature and advances the wipers 363 and 364 one step. A circuit is now completed for relay 361 by means of wiper 363, and this relay, upon energizing, removes the short-circuit from around the impulsing contact 374 at armature 371, and at armature 372 closes a circuit over conductor 341 for the stepping magnet 321 of the sequence switch S². Magnet 321 is accordingly energized, but without affecting the position of its wipers, which as previously explained, are advanced upon the denergization of the stepping magnet. The second time that the circuit of relay 362 is closed by the interrupter I, the said relay closes the circuit of the stepping magnet 365 as before, and also, since relay 361 is now energized, at armature 374 it breaks the circuit of the line relay 400 of the selector E¹. When the circuit of relay 362 is broken by the interrupter, it deenergizes and breaks the circuit of the stepping magnet 365, which retracts its armature and advances wipers 363 and 364 one more step, thus bringing the stop wiper 364 into engagement with the number 1 contact in its bank. It will be seen that the sending switch S¹ is caused to make an initial or false step before it actually begins transmitting impulses, and this, it may be stated, is done in order to insure that the first impulse transmitted will be of the standard length. The energizations and deenergizations of the relay 362 continue in quick succession under the control of the interrupter I. After the second deenergization, which terminates the first interruption, wiper 364 is advanced into engagement with its No. 1 contact, as stated, after the third deenergization wiper 364 is advanced into engagement with its No. 2 contact, and after the fourth deenergization the said wiper is advanced into engagement with its No. 3 contact. The required number of interruptions have now been produced in the circuit of the line relay 400 of the selector E¹. As previously explained, the No. 3 contact in the lower bank of sending switch S¹ is grounded, and when the stop wiper 364 comes into engagement with this contact a circuit is completed for the stop relay 360 and relay 376 in parallel. Upon energizing, relay 376 closes a locking circuit for itself and relay 360 which extends from ground by way of armature 390 and its working contact, resting contact of armature 385 and said armature, resting contact of armature 394 and said armature, armature 382 and its working contact, and the windings of relays 376 and 360 in parallel to battery. Relay 376 also removes the short-circuit from the polar relay 375 at armature 381.

Relay 360, on energizing, opens the circuit of the impulsing relay 362 at armature 368, to stop the transmission of impulses, and in addition, at armature 366, closes an automatic stepping circuit for magnet 365, which now operates automatically under the control of wiper 363 to advance the sending switch to normal position. When the sending switch wipers reach their normal position, wiper 363 will no longer find ground and the magnet 365 will cease its operation. Also relay 361 is deenergized, at armature 371 replaces the shunt around the impulsing contact 374, and also breaks the circuit of magnet 321 of the sequence switch S² at armature 372. Magnet 321 is accordingly deenergized to advance the wipers of the sequence switch to second position. The only change brought about by the advance of the sequence switch wipers from first to second position is the transfer of the ground connection from the wiper 220 of switch H¹ to wiper 221, which results in the grounding of the No. 4 contact in the bank of the stop wiper 364. The ground potential on said contact is established by way of the grounded wiper 319 in second position, conductor 225, wiper 221, terminal 256, a jumper, No. 4 bus-bar, and conductor 244 to the No. 4 bank contact associated with the stop wiper 364.

Although the sending switch S¹ has been returned to normal, the stop relay 360 and the relay 376 still remain locked up, due to the previously described locking circuit. The latter relay, it should be noted, removes the short-circuit from the polar relay 375 at armature 381.

*Operating the first selector.*

The operation of the selector E¹ responsive to the first series of impulses of the code may now be considered. As explained before, the circuit of the line relay 400 is interrupted three times at contact 374 of the impulsing relay 362, and the said line relay accordingly deenergizes three times and at armature 418 transmits three impulses to the vertical magnet 407. In response to these impulses the vertical magnet operates to raise the selector shaft step by step until the wipers 420, 421, and 422 reach a position opposite the third level of bank contacts. Slow-acting series relay 402 is energized in series with the vertical magnet 407, maintains its armature 409 attracted throughout the vertical movement of the switch, and as soon as off normal springs 413 close on the first vertical step, completes a circuit for the stepping relay 403. Upon energizing, relay 403 closes a locking circuit for itself at armature 411 and at armature 412 prepares a circuit for the rotary magnet 405. At the end of the vertical movement of the switch relay 402 falls back and at the resting contact of its armature 409 completes the rotary magnet circuit. The rotary magnet 405 is, therefore, energized and advances the wipers into engagement with the first set of contacts in the level opposite which they were raised. At the same time the rotary magnet breaks the locking circuit of the stepping relay 403, and the stepping relay deenergizes and breaks the circuit of the rotary magnet at armature 412, whereupon the rotary magnet deenergizes also and again closes its interrupter contact. The operation now depends on whether the test contact engaged by the test wiper 421 is grounded or not. If the first trunk line terminating in the third level is busy, the test contact associated with such trunk line will have a ground potential on it, the switching relay 404 will be short-circuited, and the stepping relay 403 will be again energized. Relay 403 accordingly again closes the rotary magnet circuit which operates to advance the switch wipers another step into engagement with the contacts associated with the next trunk line. These operations, involving alternate energizations of the rotary magnet and the stepping relay, continue until the wipers reach a set of contacts in which is terminated an idle trunk line. It will be assumed that the first idle trunk line encountered is the one comprising conductors 440, 441 and 442, and extending to the second selector E².

When the test wiper 421 is brought to rest in engagement with test contact 424, it finds no ground potential and it follows, therefore, that on the retraction of the armature of the rotary magnet 405, the stepping relay 403 will not be energized. Instead, the switching relay 404, which for the time being has been short-circuited, is energized in series with relay 403, the high resistance of relay 404 preventing the latter relay from operating. On energizing, relay 404 connects the release trunk conductor 41 to the test wiper 421, thereby grounding test contact 424 and making the selected trunk line busy. In addition, relay 404 removes ground from the line relay armature at its armature 414, and at armatures 415 and 417 relay 404 disconnects the incoming trunk conductors 82 and 83 from the windings of the line relay 400 and extends them by way of wipers 420 and 422, bank contacts 423 and 425, trunk conductors 440 and 442, and armatures 456 and 455 to the windings of the line relay 450 of the second selector E². Line relay 450 is accordingly energized and closes a circuit for the slow-acting release relay 451. At its lower armature relay 451 prepares the switch for its vertical operation in the usual manner, and at its upper armature connects ground to the release trunk conductor 441, thus establishing a holding circuit which extends by way of conductor 441, test contact 424, test wiper 421, and armature 416 and its working contacts to the release trunk conductor 41. The holding circuit including conductors 441 and 41, except that it is grounded further along in the connection, will be used later on to retain the switches involved in the connection in operated position.

*Sending the second office code digit.*

It will be observed that the trunk conductors 440 and 442 extending to the second selector E² are reversed or transposed, and it follows, therefore, that as soon as the connection is extended to this selector, the direction of current flow in the trunk conductors 82 and 83 and in the loop impulsing circuit comprising conductors 136 and 137 will be reversed also, resulting in the operation of the polar relay 375. Relay 375 now operates its armature in the proper direction to close the circuit of relay 377, which prepares a locking circuit for itself at armature 383, and breaks the locking circuit of relay 378 at armature 384. The latter relay accordingly falls back, whereupon the previously prepared locking circuit for relay 383 is completed at armature 389. When relay 377 energizes, at its armature 385 it removes ground from armature 382 of relay 376, and since ground is not reapplied to armature 382 until relay 378 has had time to fall back, the locking circuit for relays 376 and 360 is broken long enough to permit the former relay to retract its armature 382, which permanently opens the locking circuit and permits both relays to remain deenergized.

The foregoing is descriptive of the operation provided the sending switch $S^1$ reaches its normal position before the polar relay 375 is operated. It may happen, however, as for example when a short series of impulses is transmitted, or when no extended trunk selecting operation of the selector is required, that the polar relay is operated first, in which case the relays 360 and 376 will not be unlocked by the operation of the polar relay and relay 377, but will be held up until the sending switch returns to normal. This is taken care of by relay 395. Assuming that the sending switch $S^1$ is still rotating when the polar relay and relay 377 are operated, the relay 361 will be in energized position, and when relay 377 opens the locking circuit of relays 360 and 376 at armature 385, these relays will be held up over a new circuit extending from ground by way of armature 370 of relay 361, armature 393 and its resting contact, winding of relay 395, armature 382 and its working contact, and the windings of relays 360 and 376 in parallel to battery. Relay 395 is at once energized and at armature 394 opens the previous locking circuit. Then when the sending switch eventually arrives at its normal position, the deenergization of relay 361 opens the circuit of relays 395, 360, and 376 at armature 370, and all these relays deenergize, the original locking circuit being broken at armature 382 before it can be reestablished at armature 394.

The second series of code impulses is now transmitted similar to the manner in which the first series was transmitted. When the stop relay 360 falls back it completes the circuit for the impulsing relay at armature 368, and this relay is accordingly operated intermittently by the interrupter I to advance the wipers of the sending switch step by step through the medium of the stepping magnet 365. At the first step of the switch, relay 361 is energized, closes the circuit of the stepping magnet 321 of the sequence switch $S^2$ at armature 372, and at armature 371 removes the shunt from around the impulsing contact 374, which permits relay 362 to interrupt the circuit of the line relay 450 of the second selector $E^2$ each time it closes the circuit of the stepping magnet 365. Thus four interruptions will be produced in the circuit of said line relay by the time the stop wiper 364 arrives at the No. 4 contact in its bank. The No. 4 contact is now grounded, as previously explained, and relays 360 and 376 are accordingly again energized, a locking circuit being established at armature 382 as before. Relay 360 also breaks the circuit of the impulsing relay 362 at its armature 368, and at armature 366 closes the automatic rotary circuit for the stepping magnet 365, by means of which the sending switch is advanced to normal. Relay 361 then falls back and at armature 372 breaks the circuit of the magnet 321 of sequence switch $S^2$, whereupon the sequence switch wipers are advanced to third position.

*Skipping the third and fourth office code digits.*

The operation of the second selector $E^2$ responsive to the second series of code impulses and the subsequent operations which result in the extension of the connection to the repeater R, Fig. 3 will be deferred awhile to permit the explanation of operations in the director which result from the advance of the sequence switch to third position. It may be explained that the provision of four wipers on the Strowger switches, such as the switch $H^1$, and the circuit arrangement by which these wipers are grounded successively by the wiper 319 of the sequence switch renders it possible to transmit codes comprising a maximum of four series of impulses, which is thought to be sufficient in most cases, although additional series of impulses can be provided for by adding more wipers and banks to the Strowger switches. In the present case, since the code consists of only two series of impulses, the sequence switch must be advanced automatically through its third and fourth positions, in order to have the director ready for the transmission of the impulses corresponding to the thousands digit as soon as the second selector $E^2$ and the secondary line switch $C^1$ have completed their operations. This is accomplished by connecting terminals 255 and 254 to the special bus-bars 271 and 270, respectively, instead of to any of the upper bus-bars which are associated with the bank of the sending switch. With this explanation, it will be readily understood that when the sequence switch arrives in third position, a circuit will be completed for the stepping magnet 321 as follows: Grounded wiper 319 in third position, conductor 226, wiper 222, terminal 255, a jumper connecting said terminal with bus-bar 271, conductor 238, wiper 318 in third position, the interrupter contact of magnet 321, and through the winding of said magnet to battery. The completion of this circuit causes a momentary energization of magnet 321 to advance the sequence switch wipers to fourth position, whereupon a similar circuit is completed by way of the grounded wiper 319 in fourth position, conductor 227, wiper 223, terminal 254, a jumper connecting said terminal with bus-bar 270, conductor 239, wiper 318 in fourth position, and thence through the interrupter contact and stepping magnet to battery. The stepping magnet is accordingly again energized momentarily to advance the sequence switch wipers into the fifth or thousands position. These operations of the stepping magnet 321 take place very rapidly, and the sequence switch is advanced through its third and fourth positions in a small fraction of a second.

*Operating the second selector and the outgoing secondary line switch.*

The operation of the second selector E², Fig. 2, responsive to the second series of impulses of the office code may now be considered. As before explained, four interruptions are produced in the circuit of the line relay 450, and this relay is accordingly de-energized momentarily four times to raise the wipers 460, 461, and 462 opposite the fourth level by means of the vertical magnet 457. In view of the explanation of the operation of the first selector E¹ which has already been given, it will be unnecessary to explain in detail how the second selector E² operates; but it will be sufficient to say that after the wipers are raised to the fourth level they are automatically rotated by the rotary magnet 458 until an idle trunk line is reached. Assuming that the first idle trunk line encountered is the one comprising conductors 500, 501 and 502 extending to the secondary rotary line switch C¹, Fig. 3, when the selector wipers arrive at bank contacts 463, 464, and 465 the rotation of the switch will cease and the switching relay 454 is energized. At its armature 459 the switching relay 454 connects the release trunk conductor 441 to the test wiper 461 in order to make the selected trunk line busy; and at its armatures 456 and 455 the switching relay 454 disconnects the trunk conductors 440 and 442 from the windings of the line relay 450, and extends them by way of wipers 460 and 462, bank contacts 463 and 465, trunk conductors 500 and 502, and armatures 508 and 511 of relay 503 of the line switch C¹ to the winding of the line relay 504 and to ground, respectively.

When the connection is extended to the line switch C¹ as previously described, the line relay 504 is energized and at armature 507 connects ground to the release trunk conductor 501. This operation serves to maintain a local ground on the test contact 464 after the slow-acting relay 451 of the selector E² has fallen back. The line relay 504 also closes a circuit for the switching relay 503 in series with the stepping magnet 512 at armature 506, while at armature 505 it connects the test wiper 521 to the circuit of the switching relay at a point between said relay and the interrupter contact of the stepping magnet. If the wipers of the line switch are standing on a busy trunk line, the switch now operates in the well-known manner to advance its wipers through the medium of the stepping magnet 512 to an idle trunk line, but if the trunk line upon which the wipers are standing is idle, as will be assumed to be the case, no rotation of the switch will take place. Instead, the switching relay 503 is immediately energized, and at its armatures 509 and 510 connects the incoming release trunk conductor 501 with the test wiper 521 in order to make the selected trunk line busy by grounding the test contact 524. At the same time, of course, the test wiper is disconnected from the test circuit at the resting contact of armature 510. In addition to the foregoing, at armatures 508 and 511 the switching relay disconnects the incoming trunk conductors 500 and 502 from the line relay 504 and from ground, respectively, and extends them by way of wipers 520 and 522, bank contacts 523 and 525, trunk conductors 526 and 528, left hand windings of the repeating coil in the repeater R, and contact springs of the reversing relay 534 to the lower and upper windings of the line relay 535 of the said repeater, respectively.

When the connection is extended to the repeater R as explained in the foregoing, the line relay 535 is energized and completes a circuit for the slow-acting release relay 536 at armature 538. On energizing, relay 536 places ground on the release trunk conductor 527 at armature 540, and thus establishes a holding circuit which includes release trunk conductors 527, 501, 441, and 41. This holding circuit is still grounded at armature 56 of relay 51 in the relay group D, Fig. 1, but the ground at this point is only temporary as will appear subsequently, and after the use of the director is dispensed with the ground at the repeater R will serve to maintain all of the various switches so far considered in operated position. It is noted at this time that the right hand winding of the shunt field relay 533 is energized from the grounded release trunk conductor 527 at the repeater R. Owing to the fact, however, that the right hand core of relay 533 has a complete magnetic circuit including the left hand core and the two heel pieces, the flux is shunted away from armature 537 and this armature remains unaffected.

When the line relay 535 of the repeater R is energized, it also connects the right hand windings of the repeating coil in bridge of the trunk conductors 541 and 542 at armature 539. The trunk line comprising conductors 541 and 542 extends to the distant office in which the wanted station A' is located, and there terminates in the incoming third selector E³, Fig. 4. Upon the closure of the bridge across the trunk line at the repeater R in the originating office, the line relay 600 of the third selector E³ is energized and completes a circuit for the slow-acting release relay 601, which accordingly operates and prepares the switch for its vertical movement in the usual manner. The left hand winding of the shunt field relay 533 is energized in series with the line relay of the selector E³, but this winding assists the right hand winding in producing a magnetic flux through the two cores in series, as previously explained, and consequently the armature 537 remains unoperated.

It may be pointed out now that the trunk conductors 500 and 502 leading to the secondary line switch C¹ are not reversed, and consequently when the line switch is seized by the selector E² no effect is produced on the polar relay 375 in the director. The trunk conductors 526 and 528, leading to the repeater R, however, are reversed, and it follows, therefore, that when the secondary line switch C¹ extends the connection to the repeater, the direction of current flow will be reversed in the impulsing loop comprising conductors 136 and 137 and the winding of polar relay 375. This time relay 375 actuates its armature so as to close a circuit for relay 378 which breaks the locking circuit of relay 377 at armature 389 and the locking circuit of relays 360 and 376 at armature 390. Relays 377, 376, and 360 accordingly are deenergezed, and relay 378 remains locked in energized position at armature 388.

The stop relay 360 of the sending switch S¹ having been deenergized, the sending switch is now ready to transmit the next series of impulses, or the series corresponding to the first numerical digit of the called subscriber's number. This series of impulses cannot be transmitted, however, until the digit is registered, and the circuit is so arranged, therefore, that after having transmitted the several series of impulses constituting the office code, the sending switch will not be started again unless the thousands register M⁴ has completed its operation. In view of this, it will be convenient now to return to the calling subscriber and consider the operations of the register switches M⁴ to M⁷, inclusive, in response to the dialling of the four digits of the wanted number.

*Setting the thousands register.*

When the subscriber calls the digit 2, two interruptions are produced in the circuit of the line relay 50 in the relay group D, and the line relay accordingly deenergizes twice and transmits two impulses to the stepping magnet of the thousands register switch M⁴, the master digit controller M¹ now being in its fourth position. In response to these impulses the stepping magnet 184 operates to advance the wiper 195 two steps and the wiper is brought to rest in engagement with the second contact in its bank. The slow-acting series relay 187 is energized in series with the stepping magnet 184, maintains its armature 189 attracted while the thousands register is operating, and at the end of its operation deenergizes and places ground on conductor 337. The off normal spring 194, it should be stated, is shifted into engagement with its working contact on the first step of the thousands register, and supplies ground to conductor 337 by way of armature 189 after the same has been retracted as explained.

The slow-acting series relay 140 in the master digit controller is also operated in series with the stepping magnet 184 of the thousands register, and after the thousands register has completed its operation, relays 140 and 141 cooperate in transmitting a momentary impulse to the stepping magnet 153 of the master digit controller, whereby the wiper 157 is advanced to fifth position. This transfers the impulsing circuit to the stepping magnet 182 of the hundreds register M⁵.

*Setting the hundreds, tens, and units registers.*

It will be unnecessary to explain in detail the operation of registers M⁵, M⁶ and M⁷, since these registers are operated in the same manner as is the register M⁴. When the calling subscriber dials the digit 3 of the called number, three impulses are transmitted to the stepping magnet 182 of register M⁵, and wiper 196 is advanced into engagement with the third contact in its bank. The impulsing circuit is then transferred to the stepping magnet 180 of the tens register M⁶ by the master digit controller M¹, and the dialling of the next digit 4 results in the operation of the stepping magnet 180 to advance wiper 197 into engagement with the fourth contact in its bank. The master digit controller M¹ now shifts the impulsing circuit to magnet 178 of units register M⁷, and when the final digit is dialled wiper 198 will be advanced into engagement with the fifth contact in its bank. After the operation of the units register M⁷ the wiper 157 of the master digit controller is advanced one more step and the impulsing circuit is opened. It will be noted that there is a conductor 338 associated with the hundreds register M⁵ and a conductor 339 associated with the units register M⁷, which conductors are grounded in turn as soon as their associated registers have been operated.

Sending the thousands digit.

We may now return to a consideration of the sending switch S¹ and its operation in transmitting the several series of impulses corresponding to the four digits of the called number, as registered on the register switches M⁴ to M⁷, inclusive. It will be recalled that the explanation of the operation of the sending switch was discontinued at a point following the deenergization of the relays 360 and 376 after the connection had been extended to the repeater R by the transmission of the two series of impulses constituting the office code. It will be recalled also that the sequence switch S² has been automatically advanced through its third and fourth positions to the fifth position. After having completed the transmission of the office code, the further operation of sending switch S is contingent on the calling subscriber having dialled the first or thousands digit of the number, and if this digit has not been registered, the sending switch will wait until it is. We may assume, however, that the thousands digit has been registered, and that conductor 337 has been grounded at the thousands register switch M⁴ as previously explained. Conductor 337 terminates in the fifth or thousands contact in the bank of sequence switch wiper 317 and since the sequence switch wipers are now standing in fifth position, when the stop relay 360 of the sending switch S¹ falls back, a circuit will be again completed for the impulsing relay 362. Relay 362 is now operated intermittently under the control of the interrupter I as before, and steps the wipers of the sending switch around by means of the stepping magnet 365. On the first step of the switch relay 361 is energized and removes the short from the impulsing contact 374 to permit relay 362 to interrupt the loop control circuit. Relay 361 also closes the circuit of the stepping magnet 321 of the sequence switch S², which is energized. Since the wiper of the thousands register M⁴ is standing on the second contact in its bank, the No. 2 contact in the bank of the stop wiper 364 will now be grounded, the circuit being traceable from ground by way of wiper 319 in thousands position, conductor 336, wiper 195 and the second contact in its bank, and conductor 242 to the No. 2 contact in the bank of the stop wiper 364.

It follows that after two impulses have been transmitted by the impulsing relay 362, the stop relay 360 and relay 376 will be energized by the arrival of the stop wiper 364 at the No. 2 contact in its bank, and these relays are locked up as before at armature 382 of relay 376. This relay also removes the short-circuit from the polar relay 375 at armature 381. The stop relay 360 breaks the circuit of the impulsing relay 362 and also closes the automatic rotary circuit whereby the sending switch is advanced to normal position under the control of wiper 363. When the sending switch completes its operation, the relay 361 is deenergized and breaks the circuit of the stepping magnet 321 of the sequence switch S², which accordingly deenergizes and advances the sequence switch wipers to the sixth or hundreds position. By the advance of the sequence switch wiper 319 ground is transferred from the wiper 195 of the thousands register M⁴ to the wiper 196 of the hundreds register M⁵.

Operating the incoming selector.

The series of impulses which have just been transmitted by the sending switch S¹ operates the incoming selector E³ in the distant office, the impulses being repeated over the inter-office trunk comprising conductors 541 and 542 by the repeater R at the originating office. Two interruptions are produced in the circuit of the line relay 535 of the repeater, and this relay is accordingly deenergized twice, each time opening the circuit of line relay 600 of the third selector E³ at armature 539. The line relay 600 is accordingly deenergized twice and operates the vertical magnet 605 to raise the wipers 620, 621, and 622 two steps. At the end of the vertical movement of the switch, the wipers are automatically rotated by means of the rotary magnet 606, and are finally brought to rest on the set of contacts associated with the first idle trunk line, which we will assume to be the trunk line extending to the fourth selector E⁴. Switching relay 604 is then energized, places ground on the test wiper 621 at armature 611 in order to make the selected trunk line busy, and at armatures 610 and 612 disconnects the trunk conductors 541 and 542 from the windings of the line relay 600 and extends them by way of wipers 620 and 622, bank contacts 623 and 625, conductors 630 and 632, and armatures 652 and 650 to the windings of the line relay 640 of the selector E⁴.

When the connection is extended to selector E⁴, the line relay 640 is energized and completes a circuit for the slow-acting release relay 641, which prepares the switch for its vertical operation in the usual manner. Relay 641 also places ground on the release trunk conductor 631 and thus establishes a holding circuit for the selector E³ which extends by way of conductor 631, test contact 624, test wiper 621, armature 611 and its working contact, the winding of the switch relay 604, and the winding of the stepping relay 603 to battery. This holding circuit is established before the slow-acting release relay 601 has had time to deenergize and serves to maintain the selector in operated position in the usual manner.

Sending the hundreds digit.

The trunk conductors 630 and 632 extending to the selector E⁴ are reversed and as a result, when the connection is extended to selector E⁴, the direction of current flow in the trunk conductors 541 and 542, and in the left hand winding of the shunt field relay 533 at the repeater R will be reversed also. The two windings of the shunt field relay now set up a flux through their respective cores in parallel, rather than in series, and armature 537 is attracted to close the circuit of the reversing relay 534. On energizing, relay 534 reverses the trunk conductors 526 and 528 with respect to the windings of the line relay 535, and accordingly reverses the direction of current flow in the loop control circuit including conductors 136 and 137. The polar relay 375 is now operated and closes the circuit of relay 377 which breaks the locking circuit of relay 378 and the locking circuit for relays 376 and 360 as has been previously explained. Relay 377, of course, remains locked up at its armature 383.

If the second digit of the number has already been registered on the hundreds register M⁵, as will be assumed to be the case, the sending switch S¹ now begins operating to transmit the corresponding series of impulses for the purpose of operating the selector E⁴ at the distant office. It will not be necessary to go into these operations in detail again, but it will be sufficient to state that since the wiper 196 of the hundreds register M⁵ is in engagement with the third contact in its bank, the operation of the sending switch S¹ will continue until three impulses have been transmitted, when the stop wiper 364 will arrive at its No. 3 bank contact and cause the energization of relays 360 and 376. Relay 376 closes a locking circuit for both relays and also removes the shunt from the polar relay 375, while relay 360 opens the circuit of the impulsing relay 362 and closes the automatic rotary circuit for continuing the advance of the sending switch to normal.

Relay 361 is, of course, energized on the first step of the sending switch to close the circuit of the stepping magnet 321 of the sequence switch S², which is deenergized on the arrival of the sending switch in normal position to advance the sequence switch wipers to the seventh or tens position. In moving into its seventh position, wiper 319 of the sequence switch transfers the ground from wiper 196 of the hundreds register M⁵ to the wiper 197 of the tens register M⁶.

Operating the fourth selector.

By the last described operation of the sending switch S¹ a series of three impulses is transmitted to the repeater R, and the line relay 535 is accordingly deenergized three times to cause three interruptions in the circuit of the line relay 640 of the selector E⁴. Although the circuit of the left hand winding of the shunt field relay 533 is broken also, armature 537 is not retracted, since a portion of the steady flux produced by the right hand winding continues to flow through the now attracted armature whenever the circuit of the left hand winding is broken. At each interruption of its circuit the line relay 640 transmits an impulse to the vertical magnet 645, causing the said magnet to raise the switch wipers 660, 661, and 662 to the third level. At the end of the vertical movement of the switch the trunk selecting movement is initiated in the usual manner, and the wipers are rotated through the medium of the rotary magnet 646 in search of an idle trunk line. Assuming that the trunk line extending to connector H, Fig. 5, is the first one found idle, the wipers will be brought to rest in engagement with bank contacts 663, 664, and 665, whereupon the switching relay 644 will be energized. At armature 651 relay 644 connects the grounded release trunk conductor 631 to the test wiper 661 in order to make the selected trunk line busy, and at armatures 650 and 652 this relay disconnects the incoming trunk conductors 632 and 630 from the windings of the line relay 640 and extends by way of wipers 660 and 662, bank contacts 663 and 665, trunk conductors 666 and 668, and contacts of the reversing relay 700 to the windings of the line relay 701 of the connector H.

When the connection is extended to the connector H, line relay 701 is energized and closes a circuit for the slow-acting release relay 702. Upon energizing, the latter relay prepares a circuit for the vertical magnet 708 at armature 711 and at armature 712 connects ground to the release trunk conductor 667, thereby completing a holding circuit for selectors E³ and E⁴ which extends by way of the said conductor 667, test contact 664, test wiper 661, and armature 651 and its working contact to the release trunk conductor 631, which latter conductor extends back to the selector E³. The switching relays 604 and 644 are thus maintained energized by the slow-acting release relay 702 at the connector.

Sending the tens and units digits.

The trunk line conductors 666 and 668 extending to the connector H, are reversed and accordingly when the connector is seized by the selector E⁴ the direction of current flow in the trunk conductors 541 and 542 and in the left hand winding of the shunt field relay 533 will be reversed also. The two windings of the shunt field relay now set up a flux through the two cores of the relay in series, and the armature 537, being connected in a bridge across points of equal magnetomotive force, is retracted. This breaks the circuit of the reversing relay 534 which falls back and reverses the direction of current flow in the loop control circuit. The polar relay 375 is now operated in the proper direction to energize relay 378, which breaks the locking circuit of relay 377 and the locking circuit for relays 360 and 376, and locks itself at armature 388.

In addition to the series of impulses constituting the office code, the sending switch S¹ has now transmitted the thousands and the hundreds digits, the connection has been extended up to the connector H, Fig. 5, and everything is in readiness for the transmission of the tens digit to cause the vertical movement of the connector. Ordinarily, it would be expected that this tens digit would be transmitted as soon as it was registered on the register switch M⁶, as is true of the thousands and the hundreds digits, but this is not the case, owing to the omission of the reverse battery control of the starting of the final series of impulses. This revertive control feature is chiefly useful in order to afford ample time for the trunk hunting of the selectors without wasting time when the trunk hunting movements are short, and consequently is of no utility in the case of the final digit, for there is no trunk hunting movement intervening between the vertical and rotary movements of the connector. After the thousands and hundreds digits have been transmitted, therefore, and the connection has been extended to the final connector, the sending switch is caused to wait until the calling subscriber has entirely completed the dialling of the number, or until the units register M⁷ has been operated, when the sending switch is started and transmits the tens and the units digits to the connector in quick succession.

Assuming now that the units register M⁷ has finished its operation, conductor 339 will be grounded by way of the off normal springs 191, and armature 190 at the said register switch, and a circuit will be completed by way of said conductor and wiper 317 of the sequence switch in the seventh or tens position for the impulsing relay 362. The completion of this circuit initiates the operation of the sending switch for the transmission of the series of impulses corresponding to the tens digit. On the first step of the switch relay 361 is energized to remove the shunt from impulsing contact 374 and to close a circuit for the stepping magnet 321 of the sequence switch S² in the usual manner. In addition, since conductor 334 is now grounded by the wiper 319 of the sequence switch, a circuit is completed at armature 397 for relay 380, which energizes and locks itself at armature 392. At armature 391 relay 380 breaks the connection between relays 360 and 376, while at armature 393 a new locking circuit is prepared for the former relay. The operation of relay 380 cuts out the polar relay 375 and associated relays entirely so far as their having anything to do with the operation of the sending switch is concerned, but it should be remembered that relay 378 remains locked up.

The sending switch S³ having been again started as described, will continue its operation until the stop wiper 364 arrives at the No. 4 contact in its bank, which is now grounded by way of wiper 319 of the sequence switch in tens position, conductor 334, and wiper 197 of the tens register M⁶. After transmitting four impulses, therefore, the stop relay 360 will be energized and will establish a locking circuit for itself at armature 367 which may be traced from ground by way of armature 370 of relay 361, armature 393 and its working contact, working contact of armature 367 and the said armature, and the winding of relay 360 to battery. Relay 360 also breaks the circuit of the impulsing relay 362 and closes the automatic rotary circuit for the stepping magnet 365 in the usual manner. When the sending switch reaches its normal position, relay 361 falls back and breaks the circuit of the magnet 321 which deenergizes and advances the sequence switch wipers to eighth or units position. This movement of the sequence switch transfers the ground connection from wiper 197 of the tens register to wiper 198 of the units register, which is now standing in engagement with the fifth contact in its bank.

The explanation of the operation of the connector in response to the impulses of the tens digit will be deferred until the operation of the sending switch in transmitting the final digit has been explained. When the relay 361 of the sending switch restores on the said switch arriving at normal position, the locking circuit of the stop relay 360 is broken at armature 370. Relay 360 accordingly falls back and again closes the circuit of the impulsing relay 362. Since the No. 5 contact in the bank of the stop wiper 364 is now grounded, the sending switch will now operate to transmit a series of five impulses to the repeater R before the circuit of the impulsing relay 362 is broken by the stop relay. This occurs when the stop wiper 364 arrives at the No. 5 contact in its bank, at which time the stop relay 360 will be energized and will establish a locking circuit for itself at armature 367, relay 361 having already been energized at the first step of the switch. As in the former case, the stop relay, upon energizing, closes the automatic rotary circuit for the stepping magnet 365 which advances the sending switch to normal position. Relay 361 then deenergizes and breaks the circuit of the sequence switch magnet 321, which deenergizes and advances the sequence switch wipers to the ninth or switching position.

*Operating the connector.*

The operation of the connector H may now be briefly explained. When the series of four impulses constituting the tens digit is transmitted to the repeater R, the line relay 535 will be deenergized four times to produce four interruptions in the circuit of the line relay 701 of the connector H. Relay 701 is accordingly deenergized four times and at each deenergization transmits an impulse to the vertical magnet 708 over a path which may be traced from ground by way of armature 710 and its resting contact, armature 711 and its working contact, off normal springs 750 and 752, the winding of the slow-acting series relay 703, and the winding of the vertical magnet 708 to battery. By the operation of the vertical magnet wipers 740, 741, and 742 are raised opposite the fourth level of bank contacts. The slow-acting relay 703 is energized in series with the vertical magnet, and at armature 713 preserves the continuity of the vertical magnet circuit after the off normal springs have been shifted, which occurs at the first vertical step of the switch. At the end of the vertical movement, relay 703 retracts its armature 713 and transfers the local impulsing circuit to the rotary magnet 709.

The repeater R repeats the impulses constituting the units digit the same as it did those in the tens digit. Since five impulses are transmitted to the repeater, the line relay 535 will be deenergized five times to produce five interruptions in the circuit of the line relay 701 of the connector H. Line relay 701 is accordingly deenergized five times and transmits five impulses to the rotary magnet 709 over the following path: From ground by way of armature 710 and its resting contact, armature 711 and its working contact, off normal springs 750 and 751, armature 713 and its resting contact, resting contact of armature 718 and the said armature, armature 725 and its resting contact, and the winding of the rotary magnet 709 to battery. By the operation of the rotary magnet 709, the wipers of the connector are rotated step by step and are finally brought to rest in engagement with the particular set of bank contacts in which is terminated the line of station $A^1$, these contacts being indicated in the drawing by reference characters 743, 744, and 745. The slow-acting relay 706 is energized in parallel with the rotary magnet 709 and retains its armature attracted throughout the rotary movement. At armature 720 relay 706 connects the test wiper 741 to the winding of the test relay 705, and at armature 721, relay 706 shunts the contact of armature 718 in order to avoid accidental opening of the rotary magnet circuit in case the test wiper 741 should engage a grounded contact during the rotary movement. If the called line is busy when the connector wipers are brought to rest on the bank contacts 743, 744, and 745, the test wiper 741 will find a ground potential on test contact 744 and the test relay 705 will be energized. On attracting its armature 717, the test relay prepares a locking circuit for itself which is completed when the slow-acting relay 706 deenergizes. The test relay also opens the rotary magnet circuit at armature 718, and at armature 719 connects a lead from the busy machine $Q^1$ to the lower heavy talking conductor. This operation will result in giving the calling subscriber an audible busy signal after the connection has been switched through at the relay group D, Fig. 1, as will be understood shortly.

In order to simplify the explanation, however, it will be assumed that when the station A is connected with as described in the foregoing, the line is found to be idle. Under these circumstances when the test wiper 741 comes to rest on test contact 744, it will find no ground potential and the test relay 705 will not be energized. Instead, when the slow-acting relay 706 falls back, a circuit will be completed for the switching relay 707 as follows: From ground by way of armature 712 and its right hand working contact, armature 717 and its resting contact, upper winding of the switching relay 707, resting contact of armature 720 and the said armature, test wiper 741, test contact 744, winding of the switching relay 750, and the winding of the stepping magnet 751 to battery. On the closure of the above circuit relay 707 and 750 are energized in series, and the latter relay clears the line conductors 752 and 753 of their normal battery and ground connections in the line switch $C^2$. Due to the mechanical inter-locking arrangement between the armature of the line relay 754 and the armature of the switching relay 750, the latter relay is not fully operated and does not connect up the wipers of the line switch.

In the connector H when the switching relay 707 is energized, it establishes a locking circuit for itself at armature 724, and at armature 723 places direct ground on the test wiper 741. Relay 707 also breaks the rotary magnet circuit at armature 725, and at armatures 722 and 726 completes the ringing circuit by connecting up the line wipers 740 and 742. Ringing current from the Gen. is now transmitted over the called line at intervals to operate the bell at the called station and notify the called subscriber that he is wanted.

Switching through at the trunk relay equipment.

All of the automatic switches involved in the connection have now been operated, from which it will be understood that the director has fully performed its functions and may be released and restored to common use. As explained in the foregoing, when the sending switch $S^1$ reaches its normal position after transmitting the impulses corresponding to the units digit, relay 361 is deenergized and breaks the circuit of the sequence switch stepping magnet 321, which deenergizes and advances the wipers of the sequence switch to the ninth or switching position. Relay 361 also breaks the locking circuit of the stop relay 360, but this relay is slow to deenergize, and before it has time to retract its armatures a circuit is completed for the switching relay 53 in the relay group D, Fig. 1, as follows: From ground by way of armature 369 of stop relay 360, conductor 342, wiper 316 of the sequence switch in ninth or switching position, conductor 138', resistance $r$ (relay 378 being now in energized position), onducttor 138, working contact of armature 111 of relay 85, Fig. 1, finder switch wiper 95, bank contact 105, conductor 81, lower winding of reversing relay 54, and the lower winding of switching relay 53 to battery. Owing to the inclusion of the resistance $r$ in the above circuit, the reversing relay 54, which is marginally adjusted, is not operated. Relay 53, however, is operatively energized and closes a locking circuit for itself at armature 63. In addition, at armatures 62 and 65, relay 53 disconnects the trunk conductors 40 and 42 from the windings of the line relay 50 and extends them by way of the normally closed upper and lower contacts of the reversing delay 54 to the trunk conductors 82 and 83 extending to the first selector $E^1$. This operation also results in the disconnection of conductors 79 and 80 from the conductors 82 and 83, and the net result is to substitute the calling subscriber's line in the circuit of the line relay 535 of the repeater R in place of the loop control circuit extending back to the sending switch $S^1$. Since the upper and lower sets of contact springs at relay 53 are arranged to "make before break" the circuit of the line relay 535 is not interrupted and this relay remains energized in series with the calling station A.

It should be pointed out also that since there is an even number of reversals in the distant exchange, the shunt field relay 533 of the repeater R will have its armature retracted at this time, and the reversing relay 534 in the repeater will be deenergized, from which it will be seen that there is also an even number of reversals between the relay group D and the line relay 535 of the repeater. It follows that when the connection is switched through at the relay group D, the direction of current flow in the calling line will not be changed and the electropolarized relay 17 will not be operated.

Releasing the director.

When the line relay 50 of the relay group D is disconnected by the operation of the switching relay 53, the said line relay falls back and breaks the circuit of the slow-acting release relay 51. On deenergizing, relay 51 removes ground from the release trunk conductor 41, after which the switches involved in the connection to the left of the repeater R are maintained in operated position by the release relay 536 of the repeater. In addition to the foregoing, the starting circuit is opened at armature 57, the impulsing circuit at armature 58, and the circuit of relay 52 at armature 59. At the latter armature also ground is reapplied to the test contact 101. Finally, at armature 60, relay 51 breaks the holding circuit extending over conductor 77 to the finder switch F in the director. By the removal of ground from conductor 77 ground is also removed from holding conductors 133 and 135, whereupon the switching relay 85 in the finder switch F, relays 142 and 143 in the master digit controller $M^1$, relays 200 and 203 in the Strowger switch $H^1$, and relays 380 and 378 associated with the sending switch $S^1$ are deenergized. Relay 85, upon deenergizing, disconnects all the wipers of the finder switch and restores the finder to normal position ready for another call. It may be mentioned also, that relays 88 and 124 in the finder F are deenergized also at the same time as switching relay 85. These relays, however, have no function in an ordinary successful connection such as has been described.

At the master digit controller $M^1$ when relay 142 deenergizes, it connects ground to conductor 160 at armature 148, thereby closing parallel energizing circuits for release magnet 156 of the A impulse register switch $M^2$, release magnet 154 of the master digit controller, and release magnets 179, 181, 183, and 185 of the four register switches. All of the switches named are accordingly restored to normal position, the circuit of each release magnet being broken by the off normal springs when its associated switch is fully restored.

The release of Strowger switch H¹ is brought about by the deenergization of relay 200, which at armature 204 closes a circuit for release magnet 210. When the switch shaft reaches normal the release magnet circuit is broken at the off normal springs in the usual manner. Relay 203 of the Strowger switch H¹, on deenergizing, removes ground from conductor 231 and permits relay 379 to deenergize.

The sequence switch S² is restored to its normal or home position by the grounding of conductor 174 at armature 152 of relay 142 in the master digit controller. When this conductor is grounded a circuit is completed by way of sequence switch wiper 220 for the stepping magnet 321, which is momentarily operated to advance the switch wipers one more step to their normal position. Thus, all of the apparatus in the director is restored to normal and the director is rendered available for use in other connections.

*Answering by the called subscriber.*

Returning now to the main connection, this was left at the point where ringing current was being applied to the called line to signal the called subscriber. When the called subscriber answers the ringer is disconnected and a direct current bridge is closed through the transmitter and the receiver in the usual manner, causing the operation of the ring cut off relay 704 in the connector H. Upon energizing, relay 704 establishes a locking circuit for itself at armature 714, opens the ringing circuit at armatures 715 and 716, and at the working contacts of the same armatures completes the talking connection. The transmitter at the called station is now supplied with current through the windings of the double wound back bridge relay 700 at the connector, and this relay is accordingly energized. By the operation of relay 700, the incoming trunk conductors 666 and 668 are reversed with respect to the windings of the line relay 701, with the result that the direction of current flow in the left hand winding of the shunt field relay 533 at the repeater R is reversed. Relay 533 accordingly attracts its armature 537 and operates the reversing relay 534, which energizes and reverses the trunk conductors 526 and 528 with respect to the windings of the line relay 535. This operation results in the reversal of the direction of current flow in the calling line, and causes the operation of the electro-polarized relay 17, Fig. 1. Upon energizing, relay 17 short-circuits its upper winding at armature 38 in order to avoid lowering the efficiency of the talking circuit, the lower winding of this relay being sufficient to maintain it in operated position after it has once been fully operated. At armature 39 relay 17 closes a circuit for the meter Z, which is operated to register the call.

The complete connection between stations A and A¹ has now been established and the subscribers can converse as desired.

*Releasing the main connection.*

When the conversation is over with both subscribers will hang up their receivers, whereupon the connection is released. The release of the connection is controlled by the replacement of the receiver at the calling station A, which causes the line relay 535 of the repeater R to deenergize. On retracting its armature 538 relay 535 breaks the circuit of the slow-acting release relay 536, which retracts its armature 540 after an instant and removes ground from the release trunk conductor 527. By this operation the previously described holding circuit for the secondary line switch C¹, selectors E² and E¹, and the line switch C is broken, and these switches are all released and restored to normal in the customary manner. It will be unnecessary to go into these operations in detail, but it may be pointed out that in the line switch C, switching relay 19 is deenergized and restores the switch circuits to their initial condition, without, however, moving the wipers from their antecedent position. In the first selector trunk the electro-polarized relay 17 is deenergized, and likewise the switching through relay 53 of the relay group D, the latter operation serving to again connect the line relay 50 in bridge of the trunk. At the first selector E¹ the deenergization of the switching relay 404 closes a circuit for the release magnet 406 at armature 414, and the release magnet restores the shaft in the ordinary manner, its circuit being broken at the off normal springs as soon as the shaft reaches its normal position. The second selector E² is restored in the same manner. At the secondary line switch C¹ the restoring operation, consisting in the deenergization of switching relay 503, is similar to the restoring operation at the primary line switch C.

The deenergization of relay 535 at the repeater R also opens the circuit of the line relay 701 of the connector H at armature 539. On deenergizing, relay 701 breaks the circuit of the slow-acting release relay 703 which accordingly falls back and closes a circuit for the release magnet 710. Magnet 710 accordingly is energized and restores the connector H to normal position in the usual manner, its circuit being broken at the off-normal springs as soon as the connector shaft has fully restored. Relay 702 also breaks the holding circuit for selectors E⁴ and E³ by removing ground from the release trunk conductor 667. These selector switches are, therefore, restored to normal also by means of release magnets 647 and 607, respectively, the same as was described in the case of the first selector E¹.

Sending a three-digit office code.

Having explained the process of setting up and releasing a typical connection, it will be desirable now to consider briefly the establishment of several other connections, principally for the purpose of explaining the operation of the director in transmitting the office codes. For this purpose, it will be first assumed that a connection is to be established between a calling subscriber at station A, Fig. 1, and a called subscriber in the Capitol exchange whose telephone number is CAPitol 2345. The trunk lines extending from the originating exchange to the Capitol exchange are taken from the banks of third selectors. One of these trunk lines is shown in the upper half of Fig. 3, and comprises the trunk conductors 585 and 586 which extend from the repeater R¹ in the originating office to the incoming fourth selector E⁴⁴ in the Capitol office.

To proceed with the establishment of the connection, when the calling subscriber removes his receiver the individual line switch C is operated to extend the calling line to an idle trunk line, and it will be assumed that the trunk line shown in the drawing and extending to the relay equipment D is the one taken for use. As soon as the trunk line is seized, relays 50 and 51 in the relay group D are energized and the latter relay establishes a holding circuit for the line switch in the usual manner. At the same time the finder switch associated with an idle director is started hunting for the trunk, and assuming that the finder switch F is the one which is started, this switch will connect its associated director to the trunk in the manner previously explained and pointed out.

The calling subscriber will now operate his calling device in accordance with the three significant letters C, A, and P, of the called number, and then in accordance with the four digits 2, 3, 4, and 5. The registering equipment in the director is operated responsive to the dialling of the number precisely as in the connection which was previously described. The first series of impulses corresponding to the letter C are registered on the A impulse register M², whose wipers are brought into engagement with the fourth contacts of their respective banks; while the B and C impulses are registered on the Strowger switch H¹, the wipers of which are raised two steps and are then rotated one step into engagement with the first set of contacts in the second level. It is noted at this time that the exchange name Capitol has been chosen because the first letter is the same as the first letter of the exchange name Carlton, which renders it possible to explain the operation in connection with the same Strowger switch H¹. It will be understood, however, that if the exchange name is such that the first letter appears in a different finger-hole, then a different Strowger switch would be used. The four digits in the number are, of course, registered on the thousands, hundreds, tens and units registers M⁴, M⁵, M⁶, and M⁷, exactly the same as in the connection previously described.

It will be seen that the only respect in which the operation of registering the number CAPitol 2345 differs from the operation of registering the number CARlton 2345, is that the wipers of the Strowger switch H¹ are brought into engagement with the first set of contacts of the second level instead of into engagement with the second set of contacts of this level. This is sufficient, however, to cause an entirely different trunking operation which will result in trunking the call to the Capitol exchange rather than to the Carlton exchange. The desired result is, of course, obtained by properly cross connecting the four terminals 250 to 253, inclusive, on the left hand side of the I.D.F., which are the terminals selected by the operation of switch H¹, to the bus-bars on the right hand side of the I.D.F. An inspection of Figs. 2 and 3 will show that the repeaters, such as the repeater R¹, which are associated with the trunk lines extending to the Capitol exchange, are accessible from the second level of a certain group of third selectors, one of which is the third selector E³³; and it will be seen further that this particular group of third selectors is accessible from the sixth level of the third group of second selectors. It follows, therefore, that the office code for the Capitol office is 362. Accordingly, terminal 253 is cross connected to bus-bar No. 3, terminal 252 is cross connected to bus-bar No. 6, while terminal 251 is cross connected to bus-bar No. 2. The last terminal of the group, terminal 250, is cross connected to the special bus-bar No. 270.

The process of setting up the connection may now be gone over briefly. Conductors 230 and 231 are grounded at the connector H¹ as previously explained, and the grounding of the latter conductor causes the energization of relay 379 to shunt out the polar relay 375, which was energized as soon as the director was connected to the trunk to energize and lock up the relay 378. The grounding of conductor 230 operates the stepping magnet 321 of the sequence switch S² to move the sequence switch wipers into first position. The operation of the sequence switch places ground on the No. 3 contact in the bank of the stop wiper 364, and also starts the operation of the sending switch S¹, which accordingly transmits three impulses to the first selector E¹, after which it advances to normal, the stop relay 360 and relay 376 remaining locked up as will be readily understood. In response to this series of impulses the selector E¹ raises its wipers to the third level, and then selects an idle trunk line, which we will assume is the trunk line extending to the second selector E². The extension of the connection to the second selector E² causes the operation of the polar relay 375 which unlocks relays 360 and 376 and again starts the operation of the sending switch S¹.

The sequence switch S², in the meantime, has been advanced to its second position, in which wiper 319 grounds the No. 6 contact in the bank of the stop wiper 364. Sending switch S¹, therefore, now transmits six impulses to the second selector E², and advances to normal position, relays 360 and 376 being locked up as before. The second selector E² is operated responsive to the second series of impulses to raise its wipers to the sixth level, after which an idle trunk line is selected which we will assume to be the trunk line comprising conductors 497, 498, and 499 extending to the third selector E³³. The polar relay 375 is now operated again to unlock relays 360 and 376 in order to restart the sending switch S¹. By this time the sequence switch S² has advanced its wipers to third position, and since terminal 251 on the I.D.F. is cross connected to the No. 2 bus-bar instead of to the special bus-bar 271, the sequence switch wipers are not advanced automatically through the third position, but the sequence switch waits while the sending switch S¹ transmits another series of two impulses to the third selector E³³. It is noted that with the sequence switch wiper 317 in third position, the circuit for the impulsing relay 362 is completed from the grounded conductor 230 by way of conductor 325 and armatures 312, 318, and 323 of relays 301, 302, and 303, respectively. This, however, makes no difference in the operation.

In response to the final series of impulses in the office code the line relay 550 of the third selector E³³ is deenergized twice, and through the medium of the vertical magnet (not shown) raises the switch wipers 560, 561, and 562 to the second level, after which the automatic rotary movement is initiated and an idle trunk is selected, which we will assume is the trunk leading to the repeater R¹. When the wipers 560 to 562, inclusive, come to rest in engagement with bank contacts 563 to 565, inclusive, the switch relay 552 is energized to complete the extension of the connection to the selected trunk line in the usual manner. The line relay 578 of the repeater R¹ is now energized and completes a circuit for the slow-acting release relay 579, which operates to ground the release trunk conductor 567 and establish the usual holding circuit for the automatic switches which have so far been operated.

The trunk line conductors extending to the repeater R¹ are reversed, the same as in the case of the repeater R, and as soon as the connection has been extended to the repeater, therefore, the polar relay 375 is operated to unlock relays 360 and 376, to permit the restarting of the sending switch S¹.

By this time the sequence switch S² will have been advanced to its fifth position, the movement from the third to the fourth position being accomplished in the usual manner upon the return of the sending switch S¹ to normal position following the transmission of the third digit in the office code, while the movement from fourth to fifth position is accomplished automatically due to the fact that terminal 250 on the left hand side of the I.D.F. is cross connected to the special terminal 270. From this point on the operation of the director is the same as was described in the preceding case. Four series of impulses are transmitted to the repeater R¹, which are repeated by the said repeater over the trunk line extending to the Capitol exchange, where the incoming fourth selector E⁴⁴, a fifth selector, and a final connector are operated to complete the connection to the desired called line.

As soon as the final series of impulses has been transmitted and the sending switch S¹ has advanced to normal, the sequence switch S² advances its wipers into the ninth or switching position, whereupon a circuit is completed for the reversing relay 54 and the switching relay 53, Fig. 1, by way of conductors 138' and 138. It will be noted now that although there is an even number of reversals in the trunks which are involved in the connection in the Capitol exchange, this is not true of the trunk reversals in the originating exchange, for there are three reversals between the first selector E¹ and the repeater R¹. In view of this, it will be understood that at the time the connection is switched through by the closure of the circuit of relays 53 and 54, the relay 377 will be in energized position rather than the relay 378, for the latter relay is energized when the director is taken for use and upon every second reversal thereafter. In view of the fact that relay 378 is not in energized position, the resistance $r$ will be short-circuited and will be excluded from the switching circuit, so that when this circuit is closed relays 53 and 54 will both be energized. The operation of relay 53 connects the calling line through to the first selector E¹ the same as in the preceding case, while the reversing relay 54 reverses the trunk conductors and thus compensates for the odd reversal caused by the introduction of the additional switch E³³ in the train. The remaining operations, including the release of the director and the release of the main connection are the same as have already been described.

Sending a four-digit office code.

The operation of calling a number in an office having a four-digit code will now be described, the office selected for this purpose being the Lipton office, which is reached from the originating office by way of the Carlton tandem office. The called subscriber's number will be assumed to be LIPton 2345. Assuming that the same director is used as in the preceding case, when the calling subscriber dials the desired number, the series of impulses generated by the dialling of the letter L will be registered on the A impulse register M², while the two series of impulses generated by the dialling of the latters I and P will be registered on the Strowger switch H¹, and the wipers of the latter switch will be brought into engagement with the first contact set in the first level. This contact set is cross connected at the I.D.F. in the proper manner to trunk the call to the Lipton office, as will be readily understood. The particular cross connections necessary to produce this result, of course, depend on the trunking arrangement in the originating office for routing the call to the tandem office, and also upon the particular trunking arrangement employed in the tandem office for routing the call to the Lipton office. As explained before, access is obtained to the trunk lines extending to the tandem office by means of the two-digit code 34 and consequently terminals 261 and 260 will be cross connected to busbars 3 and 4, respectively. There are several possible arrangements of the trunking at the tandem office, but as indicated in the drawing a special group of fourth selectors is provided, one of which is the selector E⁴⁴⁴, which are accessible from the fifth level of the incoming third selectors such as the selector E³, and which have access to ten groups of trunk lines extending to as many different offices. The trunk lines extending to the particular office in which the called party is located, the Lipton office, are assumed to be taken off from the second level of these special fourth selectors, and one trunk line comprising conductors 693 and 694 is indicated in the drawing. This arrangement, of course, leaves only nine levels of the incoming third selectors, such as the selector E³, for extending connections to lines terminating in the tandem office; that is, the number of groups of local fourth selectors, such as the selector E⁴ is limited to nine, and the number of subscribers in the tandem office is reduced from 10,000 to 9,000. If this is objectionable, although in most cases it will not be, the incoming third selectors, such as the selector E³, may be used exclusively for trunking, providing for a plurality of groups of special fourth selectors such as the one accessible from the fifth level, and the local trunk lines may be taken from a certain level in one of these groups of special fourth selectors. With this arrangement fifth and sixth selectors would be provided in the tandem office. According to still another arrangement nine levels of the incoming third selectors such as the selector E³, may be used for trunking to special groups of fourth selectors, while the remaining level is used for the local trunk lines which would extend to local fourth selectors. This last arrangement would require fourth and fifth selectors in the tandem office, but no sixth selectors. Still other arrangements may be worked out and it will be understood, of course, that the trunking arrangement selected in any given case will be the one which is calculated to be the most economical under the circumstances.

In the particular case illustrated, however, the trunk lines extending to the Lipton office are accessible from the second level of a group of four selectors which in turn are accessible from the fifth level of a group of third selectors, and consequently, returning now to the I.D.F. at the director, the terminals 259 and 258 on the left hand side of the I.D.F. will be cross connected to busbars 5 and 2, respectively. It will be observed that since the code consists of four digits all of the four wipers of the Strowger switch are made use of and there will be no jumpers which have to be run to the special terminals such as 270 or 271. With this explanation of the connections at the I.D.F., it is thought that the operation of setting up the connection to the called station will be readily understood in view of the explanations which have been previously given.

Trunking a "dead number" call to the operator.

An explanation of the functions and operation of the four relays shown in Fig. 9 will now be given. We will first consider relay 302, which may be termed a "dead number" relay. It was stated hereinbefore that in a complete system there would be nine Strowger switches such as the switch H¹ in each director, requiring 3600 conductors for connecting the banks of these switches with the left hand side of the I.D.F. This would take care of 1,000 different exchanges, but, of course, in actual practice there would never be anywhere near that many in any single system. Assuming that there are 200 exchanges in a given case, there would only be 200 working contact sets in the banks of the Strowger switches, the remaining 700 sets not being assigned to any exchanges. It would be useless, therefore, to wire all of these dead contact sets to the I.D.F., and accordingly, they are left dead and unconnected, except for strapping between the lower contacts. By means of this strapping, which is done in the banks of the switches, all of the lower contacts in the dead contact sets are connected to the conductor 228 which extends to the dead number relay 302. While all of the unassigned contact sets may be left dead as stated, if any additional new exchanges can be anticipated the contact sets corresponding to such exchanges should be wired, and it is advisable also to have a certain number of extra sets of conductors in the cable extending to the I.D.F. to take care of additions or changes which can not be foreseen.

It will be assumed now that the director is taken for use by a calling subscriber and that by some accident or mistake the wipers of the Strowger switch H¹ are brought into engagement with some set of contacts which does not correspond to a working exchange, such for example as the second set of contacts in the first level. When the Strowger switch completes its operation ground is placed on conductor 230, and the sequence switch S² is advanced to first position. By this operation a circuit is completed for the dead number relay 302 from ground by way of wiper 319 in first position, conductor 324, wiper 220 of the Strowger switch H¹, bank contact engaged by this wiper, conductor 228, and the winding of relay 302 to battery. On attracting its armatures 353 and 354, relay 302 connects conductors 224 and 225 with conductors 236 and 235, respectively, which latter conductors extend to terminals 284 and 283 on the left hand side of the I.D.F. Terminal 284 is cross connected to bus-bar No. 4, while terminal 283 is cross connected to bus-bar No. 1, and the operation of relay 302, therefore, will cause the transmission of the two-digit code 41.

Responsive to the transmission of the series of impulses in the code mentioned, the wipers of the first selector E¹ will be raised to the fourth level, and an idle trunk will be selected which we will assume is the trunk line comprising conductors 470, 471, and 472 extending to the second selector E²². The second series of impulses causes the selector E²² to raise its wipers to the first level, and to select an idle trunk line in that level which we will assume is the trunk line comprising conductors 486, 487, and 488. This trunk line extends to an operator's position where it terminates in the jack J. On the connection being extended to the trunk line, relays 489 and 490 are energized, and the latter relay completes a holding circuit by grounding the release trunk conductor 487, at the same time closing a circuit for the line lamp L to signal the operator.

Since the connection to the operator has been completed by the transmission of only two series of impulses, the sequence switch will only have been advanced to its third position, and special arrangements are necessary to provide for switching through at the relay equipment D in the trunk. This is taken care of by the dead number relay 302, which at its armature 351 connects conductor 342 with the third position contact of wiper 316. In addition, at armature 352 relay 302 disconnects conductor 325 from the third position contact of wiper 317, in order to insure that the sending switch S¹ will not be started again after having transmitted the two required series of impulses. This provision is unnecessary in the case of the present connection for the trunk conductors extending to the operator's position are not reversed, but it is considered that under some conditions it may be desirable to reverse these conductors, which would release the sending switch S¹, and consequently the relay 302 is arranged to open the circuit as stated.

When the switching relay 53 at the relay group D is energized, the director is, of course, released in the usual manner. The operator at whose position the jack J appears is provided with suitable cord circuits, and on observing the lighted lamp L, she will plug into the jack J to answer the call. The calling party may now be instructed by the operator to call his number over again, and he will, therefore, replace his receiver with the result that the connection is released in the usual manner.

*Calling long distance.*

Relay 300 is provided in order to enable the subscribers to call Long Distance by a single pull on the dial. To explain this, and assuming that the director herein illustrated is being used, if the calling subscriber operates his dial in accordance with the Long Distance finger hole ten impulses will be transmitted to the A impulse register switch M², which will advance its wipers into engagement with the tenth contacts in their respective banks. There is no Strowger switch connected to the tenth contact associated with wiper 170, and consequently the operation of this wiper leaves the impulsing conductor open after the relay 143 of the master digit controller has energized. The tenth contact in the bank of wipers 171, however, has connected to it a special conductor 172 and when the said relay 143 energizes ground is placed on this conductor by means of armature 149 and wiper 171. The grounding of conductor 172 operates relay 300. On attracting its armatures 308, 309, and 310 relay 300 connects conductors 224, 225, and 226, to conductors 234, 233, and 232, respectively, which terminate in terminals 282, 281, and 280 on the left hand side of the I.D.F. Terminal 282 is cross connected to bus-bar No. 3, terminal 281 is cross connected to bus-bar No. 6, and terminal 280 is cross connected to bus-bar No. 1, these cross connections determining the office code to be 361. At armatures 306 and 307 relay 300 grounds conductors 230 and 231, this being necessary owing to the fact that no Strowger switch such as switch H$^1$ has been operated. The sending switch S$^1$ is now started as per usual and transmits three series of impulses corresponding to the code 361, by means of which the call is trunked to the toll recording operator.

It will be unnecessary to trace out the operation of the switches in detail, but it may be stated that the first series of three impulses raises the first selector E$^1$ to the first level, the second series of impulses raises a second selector such as the selector E$^2$ to the sixth level, while the single impulse constituting the final series raises a third selector such as the selector E$^{33}$ to the first level. By the usual automatic trunk hunting movement in the last mentioned selector, it may be assumed that the wipers are brought into engagement with a set of bank contacts in which is terminated the trunk line comprising conductors 570, 571, and 572. This trunk line may extend to the Long Distance operator's position if it is in the originating exchange, or if the Long Distance recording operators are at some other exchange, this trunk line may extend to a repeater similar to the repeater R$^1$, from whence a two conductor trunk line will extend to the particular office at which the Long Distance calls are handled.

The arrangement for switching through after the required number of series of impulses have been transmitted is similar to the arrangement which was explained in connection with the dead number relay 302. In the present case, however, since three series of impulses have to be transmitted instead of two, armature 304 of relay 300 is so connected that it will connect conductor 342 to the fourth position contact in the bank of wiper 316 rather than to the third position contact. Similarly, armature 305 disconnects the grounded conductor 325 from the No. 4 contact in the bank of wiper 317 rather than from the No. 3 contact.

*Calling a three-digit number.*

Relay 303 is provided in order to take care of switching through on a three-digit number. For instance, number 111 may be assigned to the trouble operator. Since this number contains only three digits some special means must be provided to switch the call through to the operator and free the director after the proper code has been transmitted. Considering the director illustrated, and assuming that a calling subscriber dials number 111, the A impulse register M$^2$ will operate to select the first Strowger switch (not shown) in response to the first impulse. The next two impulses will cause the selected Strowger switch to raise its wipers one step opposite the first level and to rotate the wipers into engagement with the first set of contacts. From this set of contacts there extends a set of four conductors which terminate in terminals 288, 287, 286, and 285 on the left hand side of the I.D.F. Terminal 288 is cross connected to bus-bar No. 4 while terminal 287 is cross connected to bus-bar No. 2, thus providing for the two-digit code 42. The operated Strowger switch grounds conductors 230 and 231 in the usual manner, it being understood that these conductors are multipled in all of the Strowger switches of this particular director, whereupon the sending switch S$^1$ is started operating and transmits two series of impulses in accordance with the code 42.

In response to the two series of impulses, one of which consists of four impulses and the other of which consists of two, the selector E$^1$ is raised to the fourth level, and the selector E$^{22}$ or a similar selector is raised to the second level, whereupon a trunk line such as the one comprising conductors 480, 481, and 482 is selected. The trunk line mentioned may extend to the trouble operator's position where it terminates in equipment similar to that in which the trunk line from the first level terminates.

Following the transmission of the second series of impulses, the sequence switch S$^2$ in the director is advanced to third position, and now, since terminal 286 is cross connected to the special bus-bar No. 272, a circuit is completed for relay 303 as follows: From the grounded wiper 319 in third position, by way of conductor 226, the third wiper of the first Strowger switch, the bank contact engaged by this wiper, a conductor connecting this bank contact with terminal 286, a jumper connecting terminal 286 with bus-bar 272, conductor 237, and the winding of relay 303 to battery. Armatures 322 and 323 of relay 303 are arranged similar to armatures 317 and 318 of the dead number relay 302, from which it will be understood that the call is switched through as previously described. If desired relay 303 may be used for the switching over of other three digit numbers as well as number 111, provided, of course, that these numbers are cross connected in accordance with a two-digit code. If there are any three digit numbers which require three or four digit codes, other relays may be provided which are similar to the relay 303, but whose armatures are differently connected with respect to the banks of the sequence switch in accordance with the different lengths of the codes required.

Trunking delayed calls to the operator.

Attention is now directed to the time limit control switch M³, Fig. 6. As explained hereinbefore, when the director is taken for use and relay 142 is energized by the grounding of the holding conductor 133, a circuit is completed at armature 147 for the stepping magnet 163 of the time limit control switch so that at each revolution of the timer cam T, the stepping magnet 163 is energized and advances wiper 165 one step. The timer cam may be arranged to make one revolution every five seconds, with the result that wiper 165 will be brought into engagement with the sixth contact in its bank after a period of thirty seconds or one-half minute has elapsed. Each time that the calling subscriber operates his dial, however, relay 140 is energized and at armature 144 opens the circuit of the stepping magnet 163, while at armature 145 it closes the circuit of release magnet 164. In the ordinary course of events, therefore, the wiper 165 will never be advanced more than one or two steps. But if the calling subscriber should fail to dial a number after removing his receiver, or if he should dial one or more digits and fail to complete the number, the timing switch will eventually advance its wiper 165 into engagement with the sixth contact in its bank, and will place a ground on conductor 131. This operation results in the release of the director and any switches which may have been operated, and in the trunking of the call to an operator, as will now be explained.

When conductor 131 is grounded a circuit is completed for relay 87 of the finder switch F, Fig. 1, and this relay energizes and locks itself at armature 119. At the resting contact of armature 119 relay 87 removes ground from the holding conductors 133 and 135 with the result that all the apparatus and relays in the director which may have been operated or energized are restored to normal. At armature 120 relay 87 opens the loop control circuit including conductors 136 and 137, and thus brings about the release of any of the automatic switches which may have been operated. At armature 117 relay 87 opens the operating circuit including conductor 134, and finally at armature 118, relay 87 breaks the circuit of the slow-acting relay 88. After a brief interval, relay 88 falls back and breaks the circuit of slow-acting relay 124 which deenergizes also after a further brief interval. On deenergizing, relay 124 again grounds the holding conductors 133 and 135 at armature 122, and at armature 123 again closes the loop control circuit. The time required for relays 88 and 124 to deenergize, it may be explained, is sufficient for the apparatus to be released as stated. Relay 87 being now in energized position and relay 124 having deenergized, a circuit is completed for relay 301, Fig. 9, as follows: From the grounded holding conductor 77 by way of bank contact 102, wiper 92, armature 109 and its working contact, armature 118 and its working contact, armature 121 and its resting contact, conductor 132, and the winding of relay 301 to battery. It will be readily understood now that relay 301 may be arranged to trunk the call to any desired point, as for example to some operator whose duty it is to handle emergency calls of this nature. For convenience, however, the armatures of relay 301 are illustrated as being connected in multiple with the corresponding armatures of the dead number relay 302, from which it will be understood that the call will be trunked by means of a two-digit code 41 to the operator having the jack J, Fig. 2. It should be mentioned also that relay 301 is provided with two armatures 313 and 314 for the purpose of grounding conductors 230 and 231, this being necessary on account of the fact that no Strowger switch has been operated or if operated has been released.

Arrangement for handling lost calls due to "all trunks busy."

Attention is now directed to Fig. 10 for the purpose of explaining the special trunk circuit which is there shown. The trunk circuit shown in Fig. 10 is one of a number of arrangements which may be provided to take care of calls which become tied up owing to the fact that all of the trunks in a particular wanted group are busy. If the arrangement shown in Fig. 10 is used, one of these trunk circuits may be provided for each selector level. To explain this a little more in detail, and considering the third level of the group of first selectors which includes the first selector E¹, all of the contact sets in this level except the last constitute terminals of trunk lines extending to second selectors such as the second selector E², while the last contact set is connected to a trunk circuit such as is shown in Fig. 10. All of the other levels in this group of first selectors may be arranged likewise, as are all of the live levels in the other groups of selectors. Assuming now that a connection is being extended to the substation A¹ by means of the first selector E¹, if all of the trunk lines in the third level should be busy, the first selector E¹ will establish connection with the trunk circuit, Fig. 10. On the connection being extended to the repeater R³, the line relay 804 is energized and completes a circuit for the slow-acting release relay 805. The latter relay, on energizing, prepares a circuit for the slow-acting relay 806 at armature 811, and at armature 810 grounds the release trunk conductor 813 to establish the usual holding circuit. The incoming trunk conductors 800 and 802 are transposed, with the result that the polar relay 375 in the director is operated to start the sending switch S¹ to transmit the next series of impulses.

The second series of impulses transmitted by the sending switch in the director will accordingly operate the line relay 804, which transmits a series of impulses to the slow-acting relay 806, this relay being held up while the entire series of impulses is being received. At armature 814 relay 806 completes a circuit through the lower winding of relay 807, which is energized sufficiently to operate its armature 815. The lower winding of relay 807 is preferably made of German silver wire, having a relatively small number of turns in proportion to its resistance, and consequently the relay is not sufficiently energized to operate armatures 816 and 817. At the end of the series of impulses relay 806 deenergizes and breaks the circuit of the lower winding of relay 807, whereupon the relay 807 is fully energized by means of the upper and lower windings in series. At armature 816 relay 807 transfers the operating wire coming from armature 814 of relay 806 to the lower winding of relay 808, and at armature 817 it closes a circuit for the reversing relay 803. On energizing, relay 803 reverses the trunk conductors 800 and 802 with respect to the windings of relay 804, and thus operates the polar relay 375 in the director to start the transmission of the third series of impulses.

In response to the third series of impulses the line relay 804 is operated as before, and again energizes the slow-acting relay 806. This time, on attracting its armature 814, relay 806 closes a circuit for the lower winding of relay 808 which is energized only enough to operate armature 819. At the end of the series of impulses the slow-acting relay 806 falls back, breaks the circuit of the lower winding of relay 808, and at the same time completes a circuit for the upper and lower windings of this relay in series. Relay 808 is now fully energized and attracts its armature 818 to break the circuit of relay 807, which thereupon deenergizes, and breaks the circuit of the reversing relay 803. The deenergization of relay 803 again reverses the trunk conductors and causes the operation of the polar relay 375 in the director to start the transmission of the fourth series of impulses.

The fourth, fifth, and sixth series of impulses are received at the repeater R³ in precisely the same manner as has just been described, with the result that the reversing relay 803 will be energized immediately following the fourth series of impulses, deenergize immediately following the fifth series of impulses, and will again be energized immediately following the sixth or final series of impulses. Following the transmission of the final series of impulses the connection is switched through at the relay group D in the usual manner. A check-up on the reversals will now show that whenever relay 803 in the repeater R is energized, relay 378 in the director will be energized also, with the result that the reversing relay 54 at the relay group D will not be operated. A further check-up will demonstrate that the switching through of the trunk under these circumstances will not cause a reversal in the calling line, so that the electro-polarized relay 17 will not be operated. The function of the relay circuits in the repeater, it will now be understood, is to provide the necessary reversal after each series of impulses to cause the director to run down, so to speak, in order that the connection may be switched through.

When the repeater R³ is first seized and the slow-acting release relay 805 is energized, the right hand windings of the repeating coil are connected in bridge of trunk conductors 830 and 831 at armature 812, and the line relay 832 is energized. The trunk comprising conductors 830 and 831 extends to an operator's position where it terminates in the jack J¹ and the energization of the line relay 832 lights the line lamp L¹ to signal the operator. The operator answers the call in the usual manner by plugging in the jack J¹. Being advised to try his number over again, the calling subscriber will hang up his receiver, whereupon the automatic switches are released.

Another way of handling the "all trunk busy" problem is shown in Fig. 4 in connection with the third selector E³. The idea is to arrange the selector circuits so that whenever a selector is raised to a level in which all the trunks are busy, it will not start its trunk selecting movement, but will stand in a waiting position opposite the level until some trunk line becomes idle, whereupon the trunk selecting movement will be automatically started. The second level of the selector E³ is shown wired up to provide for this, and as indicated in the drawing, there is a chain relay such as relay 678 connected to the release trunk conductor of each trunk line in this level. When all of the trunk lines become busy, all of the relays such as 678 will be energized and a circuit will be completed for the group relay 677. In energized position relay 677 removes ground from the second level test contact 676 in the vertical test bank of the selector E³ and other similar selectors. If it be supposed now that during the establishment of the connection the selector E³ is raised to the second level, when the slow-acting series relay 602 falls back to close a circuit for the rotary magnet 606, it will be unable to do so owing to the fact that there is no ground on the test contact 676, with which the vertical test wiper 675 is now in engagement. The selector will, therefore, remain in this position until some trunk line terminating in the second level becomes idle, whereupon some chain relay will deenergize and cause the deenergization of group relay 677, which will then fall back and replace ground on contact 676. The selector will then start to rotate automatically in the usual manner in search of an idle trunk line. It will be understood of course, that no switch will be held up indefinitely while waiting for a trunk line to become available, because of the time limit control switch M³, which will switch the call over to an operator after a certain predetermined time has elapsed.

What is claimed is:

1. The combination, with a trunk line and means for transmitting series of impulses thereover, of a line relay in the trunk responsive to said impulses, and means controlled by said line relay and responsive only to entire series of impulses for transposing the conductors of said trunk line after each series of impulses is transmitted.

2. In an automatic telephone system, a director comprising means for registering and storing a call, a selector switch for use in extending connection to a called line, a sending device in said director for operating said selector to select a group of trunk lines, means for causing said selector to automatically select an idle trunk line in the group, means for preventing the initiation of the automatic selecting movement in case all of the trunk lines in the selected group are busy, means for starting the automatic selecting movement as soon as one of said trunk lines becomes idle, and means for causing said director to trunk the calling line to an operator in case one of said trunk lines does not become idle in a certain predetermined time.

3. In an automatic telephone system, automatic switches, means including a series of said switches controlled by a calling subscriber for extending a connection to a called line, and means in the exchange for operating part of the same series of switches automatically to connect the calling line with a particular other line in case the calling subscriber fails to operate any of said switches after removing his receiver.

4. In an automatic telephone system, automatic switches, means including a series of said switches controlled by a calling subscriber for extending a connection to a called line, and means at the exchange for releasing the operated switches and for reoperating the release switches in case the calling subscriber fails to complete the connection within a predetermined time.

5. In an automatic telephone system, automatic switches, means including a series of said switches controlled by a calling subscriber for extending a connection to a called line, and means at the exchange for releasing the operated switches and for operating another series of said switches including one of the released switches in case the calling subscriber fails to operate any switch within a predetermined time after the operation of the preceding switch.

6. In an automatic telephone system, a series of automatic switches for connecting a calling line with another line, a control circuit, impulse sending mechanism for transmitting a plurality of series of impulses over said control circuit to operate said switches in succession, means for reversing the direction of current flow in said control circuit after one of said switches has operated, and means responsive to said reversal for causing the sending mechanism to transmit the next series of impulses.

7. In an automatic telephone system, a series of automatic switches for connecting a calling line with another line, a control circuit, impulse sending mechanism for transmitting a plurality of series of impulses over said control circuit to operate said switches in succession, means for stopping said sending mechanism after each series of impulses has been transmitted, and means for reversing the direction of current flow in said control circuit after each switch has operated to restart said sending mechanism.

8. In an automatic telephone system, a series of automatic switches for connecting a calling line with another line, a control circuit, impulse sending mechanism for transmitting a plurality of series of impulses over said control circuit to operate said switches in succession, means for stopping said sending mechanism after each series of impulses has been transmitted, and means for reversing the direction of current flow in the trunk conductors connecting said switches for controlling the starting of said sending mechanism.

9. In an automatic telephone system, a series of automatic switches for connecting a calling line with another line, a control circuit, impulse sending mechanism for transmitting a plurality of series of impulses over said control circuit to operate said switches in succession, means for stopping said sending mechanism after each series of impulses has been transmitted, means for reversing the direction of current flow in said control circuit after each switch has operated, and a relay in said control circuit responsive to said reversals for restarting said sending mechanism.

10. In an automatic telephone system, a series of automatic switches for connecting a calling line with another line, a control circuit, impulse sending mechanism for transmitting a plurality of series of impulses over said control circuit to operate said switches in succession, means for stopping said sending mechanism after each series of impulses has been transmitted, means for reversing the direction of current flow in said control circuit after each switch has operated, a relay in said control circuit responsive to said reversals for restarting said sending mechanism, and means for shunting said relay during the transmission of each series of impulses.

11. In an automatic telephone system, means comprising trains of automatic switches for connecting a calling line with other lines, said switch trains being divided into two classes in accordance with the number of switches they contain, a reversing relay in a trunk line common to said switch trains, and means for operating said reversing relay whenever a connection is established by means of one class of switch train but not when a connection is established by means of the other class of switch train.

12. In an automatic telephone system, means comprising trains of automatic switches for connecting a calling line with other lines, some of said switch trains comprising an odd number of switches and some an even number, a reversing relay in a trunk line common to said switch trains, and means for operating said relay only in case a connection is established by means of a switch train comprising an odd number of switches.

13. In an automatic telephone system, means comprising trains of automatic switches for connecting a calling line with other lines, some of said switch trains comprising an odd number of switches and some an even number, trunk lines connecting adjacent switches in each train having their talking conductors reversed, a reversing relay in a trunk line common to said switch trains, and means for energizing said relay whenever a connection is established via a switch train in which an odd number of trunk reversals is encountered.

14. In a call director, a plurality of register switches for registering the digits in called numbers, a sending switch, permanent multiple connections between the bank of said sending switch and the banks of a plurality of said register switches, and a distributing frame for connecting the bank of said sending switch with the bank of another of said register switches.

15. In a call director, a plurality of register switches for registering the digits in called numbers, each register switch including a wiper and a bank of contacts connected in multiple with the bank contacts of the other registers, a sending switch also having a wiper and bank, multiple connections between said multiple register banks and said sender bank, and a sequence switch for connecting up the wipers of said register switches successively.

16. In a call director, a plurality of register switches for registering the digits in called numbers, each register switch including a wiper and a bank of contacts, one of said register switches including two wipers and two banks of contacts, said contact banks being connected in multiple, a sending switch also having a wiper and bank, multiple connections between said multiple register banks and said sender bank, and a sequence switch for successively grounding the wipers of said register switches.

17. In a call director, two different types of register switches for registering the digits in called numbers, each register switch including a wiper and a bank of contacts, a sending switch also having a wiper and bank, multiple connections between said banks, a stop relay in said sending switch adapted for energization by way of the wiper of said sending switch and the wiper of any register switch, and a sequence switch for successively grounding the wipers of said register switches.

18. In a call director, a two motion switch for registering two digits in a called number, a plurality of single motion switches for registering other digits in the number, and an impulse sending device separately controlled by each of said register switches.

19. In a call director, a two motion switch for registering two digits in a called number, a plurality of single motion switches for registering other digits in the number, an impulse sending device directly controlled by said single motion switches, and a translating device by means of which said sending device is controlled by said two motion switch.

20. In a call director, a two motion switch for registering two digits in a called number, a plurality of single motion switches for registering other digits in the number, an impulse sending device controlled by each of said register switches separately, and a sequence switch for shifting the control of said sending device from said two motion switch to the first of said single motion switches.

21. In a call director, a two motion switch for registering two digits in a called number, a plurality of single motion switches for registering other digits in the number, an impulse sending device directly controlled by said single motion switches, a translating device by means of which said sending device is controlled by said two motion switch, and a sequence switch for shifting the control of said sending device from said two motion switch to said single motion switches.

22. In a call director, a single motion switch for registering the first digit in a called number, a plurality of two motion switches accessible to said first switch, each of said two motion switches being adapted for registering the next two digits in the called number, and a plurality of other single motion switches for registering the remaining digits in the called number.

23. In a call director, a single motion switch for registering the first digit in a called number, a plurality of two motion switches accessible to said first switch, each of said two motion switches being adapted for registering the next two digits in the called number, a plurality of other single motion switches for registering the remaining digits in the called number, and an impulse sending device controlled by said two motion switches and by said last mentioned single motion switches.

24. In a call director, a single motion switch for registering the first digit in a called number, a plurality of two motion switches accessible to said first switch, each of said two motion switches being adapted for registering the next two digits in the called number, a plurality of other single motion switches for registering the remaining digits in the called number, an impulse sending device directly controlled by said last mentioned single motion switches, and a translating device through the medium of which said sending device is controlled by said two motion switches.

25. In a call director, a switch for registering a digit in a called number, said switch having a plurality of banks and wipers, a sending device, a plurality of successively established circuits for controlling said device, each of said circuits including one of said wipers, and a switch control circuit outgoing from said director over which said sending device transmits impulses.

26. In a call director, a switch for registering a digit in a called number, said switch having a plurality of banks and wipers, a sending device controlled by means of said wipers, means for rendering said wipers effective one after the other in a definite order, and means for skipping one wiper if a particular digit is registered.

27. In a call director, a switch for registering a digit in a called number, said switch having a plurality of banks and wipers, a sending device controlled by means of said wipers, said device including a locally controlled impulsing relay with normally closed impulse-transmitting interrupter contacts, and a sequence switch for rendering said wipers separately effective to control said device.

28. In a call director, a switch for registering a digit in a called number, said switch having a plurality of banks and wipers, a sending device, connections from the banks of said switch to said sending device for controlling said device, and means for facilitating the shifting of the connections to change the control.

29. In a call director, a register switch for selecting office codes, said switch having as many bank sections and associated wipers as there are digits in the longest code, a code sending device for operating office selectors, and means including a distributing frame for variably connecting the banks of said register switch with said device to determine the number of digits in each code and the denomination of each digit.

30. In a call director, a register switch for selecting office codes, said switch having as many bank sections and associated wipers as there are digits in the longest code, a sending device, connections from the banks of said register switch to said device, means for rendering said wipers successively effective to control said device when a code is selected, and means for automatically rendering one of said wipers ineffective in case a short code has been selected.

31. In a call director, a register switch for selecting office codes, said switch having as many bank sections and associated wipers as there are digits in the longest code, a sending device, connections from the banks of said register switch to said device, a sequence switch for rendering said wipers successively effective to control said device when a code is selected, said sequence switch having a plurality of stationary positions corresponding to said wipers, and means for preventing said sequence switch from stopping in one of said positions in case the code selected is not of the maximum length.

32. In an automatic telephone system, a series of automatic switches, a trunk line extending to the first of said switches and comprising two normally disconnected sections, means for extending a calling line to the first of said sections, a call director, means for automatically connecting said director to said trunk line at the junction of said sections responsive to the call, means in said director for registering the digits in the called number, and means in said director controlled by said registering means for transmitting impulses over the two sides of the second section of said trunk line in series to operate said switches.

33. In an automatic telephone system, a series of automatic switches, a trunk line extending to the first of said switches and comprising two normally disconnected sections, means for extending a calling line to the first of said sections, a call director, means for automatically connecting said director to said trunk line at the junction of said sections responsive to the call, means in said director for registering the digits in the called number, means in said director controlled by said registering means for transmitting impulses over the two sides of the second section of said trunk line in series to operate said switches, and means responsive to the transmission of the last series of impulses for connecting the two sections of said trunk line together.

34. In an automatic telephone system, a series of automatic switches, a trunk line extending to the first of said switches and comprising two normally disconnected sections, means for extending a calling line to the first of said sections, a call director, means for automatically connecting said director to said trunk line at the junction of said sections responsive to the call, means in said director for registering the digits in the called number, means in said director controlled by said registering means for transmitting impulses over the two sides of the second section of said trunk line in series to operate said switches, means responsive to the transmission of the last series of impulses for connecting the two sections of said trunk line together, and means for disconnecting the director to restore the same to common use when said sections are connected.

35. In an automatic telephone system, a series of automatic switches, a trunk line extending to the first of said switches and comprising two normally disconnected sections, means for extending a calling line to the first of said sections, a call director, means for automatically connecting said director to said trunk line at the junction of said sections responsive to the call, means in said director for registering the digits in the called number, means in said director controlled by said registering means for transmitting impulses over the two sides of the second section of said trunk line in series to operate said switches, relay mechanism for disconnecting the director and for connecting the two sections of said trunk together, and means for operating said relay mechanism as soon as the last series of impulses has been transmitted.

36. In an automatic telephone system, a series of automatic switches, a trunk line extending to the first of said switches and comprising two normally disconnected sections, means for extending a calling line to the first of said sections, a call director, means for automatically connecting said director to said trunk line at the junction of said sections responsive to the call, means in said director for registering the digits in the called number, means for translating certain of said digits into a set of code digits, and a sending device in said director for transmitting series of impulses over the second section of said trunk line in accordance with the code digits and the untranslated digits to operate said switches.

37. In an automatic telephone system, a series of automatic switches, a trunk line extending to the first of said switches and comprising two normally disconnected sections, means for extending a calling line to the first of said sections, a call director, means for automatically connecting said director to said trunk line at the junction of said sections responsive to the call, means in said director for registering the digits in the called number, means for translating certain of said digits into a set of code digits, a sending device in said director for transmitting series of impulses over the second section of said trunk line in accordance with the code digits and the untranslated digits to operate said switches, and means responsive to the transmission of the last series of impulses for connecting the two sections of said trunk line together.

38. In an automatic telephone system, a series of automatic switches, a trunk line extending to the first of said switches and comprising two normally disconnected sections, means for extending a calling line to the first of said sections, a call director, means for automatically connecting said director to said trunk line at the junction of said sections responsive to the call, means in said director for registering the digits in the called number, means for translating certain of said digits into a set of code digits, a sending device in said director for transmitting series of impulses over the second section of said trunk line in accordance with the code digits and the untranslated digits to operate said switches, means responsive to the transmission of the last series of impulses for connecting the two sections of said trunk line together, and means for disconnecting the director to restore the same to common use when said sections are connected.

39. In an automatic telephone system, a series of automatic switches, a trunk line extending to the first of said switches and comprising two normally disconnected sections, means for extending a calling line to the first of said sections, a call director, means for automatically connecting said director to said trunk line at the junction of said sections responsive to the call, means in said director for registering the digits in the called number, means for translating certain of said digits into a set of code digits, a sending device in said director for transmitting series of impulses over the second section of said trunk line in accordance with the code digits and the untranslated digits to operate said switches, relay mechanism for disconnecting the director and for connecting the two sections of said trunk together, and means for operating said relay mechanism as soon as the last series of impulses has been transmitted.

40. In a call director, register switches for registering the digits in called numbers, a sending device controlled by said register switches whenever a number having the normal number of digits is registered, and a relay for controlling said sending device only when a number is registered which has less than the normal number of digits.

41. In a call director, register switches for registering the digits in called numbers, a sending device controlled by said register switches whenever a number having the normal number of digits is registered, an operator's switchboard to which a number is assigned having less than the normal number of digits, and a relay for operating said sending device in accordance with a particular code when and only when the number of said switchboard is registered.

42. In a multi-office automatic telephone system, means for registering all the digits in a called number, means for translating the digits which have to do with the office selection into a code in accordance with which the call is trunked to the desired office, and means for transmitting the remaining digits to the desired office without translation.

43. In a multi-office telephone system, means for registering all the digits in a called number, means for translating the digits which have to do with the office selection into a suitable office code, impulse transmitting mechanism operated in accordance with said code, a series of automatic switches controlled by said mechanism to trunk the call to the desired office, means for then operating said mechanism to transmit series of impulses in accordance with the untranslated digits, and a series of switches in the desired office responsive to said series of impulses to complete the connection to the called line.

44. In a multi-office telephone system in which all the telephone numbers have the same number of digits, means for registering the digits in a called number, means for translating those digits in the number which have to do with the office selection into a code, the number of digits in the code being variable and depending on the office in which the called station is located, sending mechanism controlled in accordance with the code digits and the untranslated digits, and automatic switches controlled by said sending mechanism to connect the calling and called lines.

45. In an automatic telephone system, a calling line, a series of automatic switches for completing the connection to the called line, a trunk line extending to the first of said switches, a group of register senders, means for connecting any idle register sender to said trunk line, a calling device at the station on said calling line for setting the registering means in the connected register sender to register the digits in the called number, and a sending device controlled by the said registering means to transmit series of impulses over the two sides of said trunk line in series to operate said switches.

46. In a call director, a code selector responsive to impulses transmitted over a calling line, a combined impulse transmitting and counting device, a distributing frame, connections between the bank of said selector and one side of said frame, connections between the other side of said frame and the counting portion of said device, and jumpers connecting the opposite sides of said frame.

47. In a telephone system, exchanges grouped according to the first letter of the office names, a director, a plurality of office code selectors in said director, one for each of said groups, and a register switch in said director responsive to the first digit in a called number to select one of said code selectors.

48. In a call director, a plurality of office code selectors, each having a capacity of one hundred different codes, a switch for selecting any desired one of said code selectors, and means for operating said switch responsive to the first digit in a called number.

49. In a call director, a plurality of office code selectors, a switch having access to said selectors, a control wire terminating in said switch, means responsive to the first digit in a called number for sending impulses over said conductor to operate said switch to select one of said code selectors, and means in said switch for extending said conductor to the selected code selector.

50. In a telephone system, a train of automatic switches for connecting a calling and a called line, a director including means for registering the called number and means for transmitting series of impulses to operate said switches, an operator's switchboard, and means for causing the director to trunk the calling line to said switchboard through certain of said switches in case the calling party fails to register all the digits in the called number.

51. In a telephone system, a train of automatic switches for connecting a calling and a called line, a director including means for registering the called number and means for transmitting series of impulses to operate said switches, an operator's switchboard, and means for causing the director to trunk the calling line to said switchboard through certain of said switches in case the calling party fails to register all the digits in the called number, said means including a timing device for bringing about the stated operation of the director only after the lapse of a predetermined time interval.

52. In a telephone system, a trunking system for connecting calling and called lines, said system comprising directively controlled selector and connector switches, a director comprising means for registering a called number and means for transmitting series of impulses to control a series of said switches to complete the required connection, a group of trunk lines accessible through certain of said switches, and means for causing said director to transmit the impulses necessary to connect the calling line with one of said trunk lines in case the calling party fails to to register all the digits in the called number.

53. In a call director, a plurality of register switches for registering the digits in called numbers, each register switch including a wiper and a bank of contacts, a sending switch also having a wiper and blank, multiple connections between said banks, a stop relay in said sending switch adapted for energization by way of the wiper of said sending switch and the wiper of any register switch, a sequence switch for successively grounding the wipers of said register switches, and a stepping magnet for said sequence switch controlled by said stop relay.

54. In a call director, a two motion switch for registering two digits in a called number, a plurality of single motion switches for registering other digits in the number, and an impulse sending device in said director controlled by each of said register switches independent of the others.

55. In a call director, a two motion switch for registering two digits in a called number, a plurality of single motion switches for registering other digits in the number and an impulse sending device separately controlled by each of said register switches while the same are standing in set position.

56. In an automatic telephone system, calling and called lines, a calling dial on the calling line for transmitting directive control series, each series constituting a directive control digit of the calling number of a called line, an interposed storing device for receiving the respective series sent from the dial and then itself sending spaced series automatically with predetermined correspondence to the series sent from the dial effective to a plurality of linking switches successively to link a connection from a calling to a called line, and means for prolonging the normal spacing between two series sent from the storing device after the operation of the first affected switch regardless of normal spacing of the series as sent from the dial.

57. In an automatic telephone system, calling and called lines, linking switches terminating trunk links, a calling dial on the calling line for transmitting series of directive impulses for causing the operation of certain ones of the said switches to progress a connection from the calling line in the direction of the called line, and means whereby if a said trunk link is found busy when progressing a call the progressed portion of the call will be effaced and a re-progression of the call will be then automatically made involving a link other than the said busy link whereby the call will be again progressed in the direction of the called line.

58. In an automatic telephone system, calling and called lines, linking switches terminating trunk links, a calling dial on the calling line for transmitting series of directive impulses for causing the operation of certain ones of the said switches to progress a connection from the calling line in the direction of the called line, and means effective consequent upon a said trunk link being encountered as busy whereby the progressed portion of the call will be automatically effaced and a re-progression of the call will be then automatically made involving a link other than the said busy link whereby the call will be again progressed in the direction of the called line.

59. In an automatic telephone system, calling and called lines, linking switches terminating trunk links, a calling dial on the calling line for transmitting series of directive impulses for causing the operation of certain ones of the said switches to progress a connection from the calling line in the direction of the called line and means effective consequent upon a said trunk link being encountered as busy whereby the progressed portion of the call will be automatically effaced and a re-progression of the call made without special dial control.

60. In an automatic telephone system, calling and called lines, linking switches terminating trunk links, a calling dial on the calling line for transmitting series of directive impulses for causing the operation of certain ones of the said switches to progress a connection from the calling line in the direction of the called line, and means effective consequent upon a said trunk link being encountered as busy whereby the progressed portion of the call will be automatically effaced and a re-progression of the call will be then automatically made involving a link other than the said busy link and whereby the call will be again progressed in the direction of the called line the re-progression being made without specific dial control.

61. In an automatic telephone system, calling and called lines, linking switches terminating trunk links, a calling dial on the calling line for transmitting series of directive impulses for causing the operation of certain ones of the said switches to complete a connection from a calling line to an office containing a called line, and means whereby if a trunk link is found busy when progressing a call re-progression of the call will be automatically made without specific directive control from the dial involving a link other than the said busy link whereby the call will be progressed to the said office.

62. In an automatic telephone system, calling and called lines, linking switches terminating trunk links, a calling dial on the calling line for transmitting series of directive impulses for causing the operation of certain ones of the said switches to complete a connection from a calling line to an office containing a called line, and means whereby if a trunk link is found busy when progressing a call a re-progression of the call will be automatically made involving a link other than the said busy link whereby the call will be progressed to the said office.

63. In an automatic telephone system, calling and called lines, linking switches terminating trunk links, a calling dial on the calling line for transmitting series of directive impulses for causing the operation of certain ones of the said switches to complete a connection from a calling line to an office containing a called line, and means whereby if a trunk link is found busy when progressing a call a re-progression of the call will be automatically made without specific directive control from the dial involving a link other than the said busy link whereby the call will be progressed to the said office and then completed to the said called line.

64. In an automatic telephone system, calling and called lines, linking switches terminating trunk links, a calling dial on the calling line for transmitting series of directive impulses for causing the operation of certain ones of the said switches to complete a connection from a calling line to an office containing a called line, means whereby if a busy trunk link condition is found when progressing a call a re-progression of the call will be automatically made without specific directive control from the dial involving a link other than the said busy link whereby the call will be progressed to the said office and then completed to the said called line without the party operating the dial being aware of the said busy condition encountered.

65. In an automatic telephone system, calling and called lines, linking switches terminating trunk links, a calling dial on the calling line for transmitting series of directive impulses for causing the operation of certain ones of the said switches to complete a connection from a calling line to an office containing a called line, means whereby if a busy trunk link condition is found when progressing a call the progressed extension of the call will be automatically effaced and a re-progression of the call will be automatically made without specific directive control from the dial involving a link other than the said busy link whereby the call will be progressed to the said office and then completed to the said called line without the party operating the dial being aware of the said busy condition encountered.

66. In an automatic telephone system, calling and called lines, a switch, linking switches terminating trunks of a group respectively, a calling dial on the calling line for transmitting series of directive impulses for causing the operation of said switch to complete a connection from the calling line over a trunk link of the group to an office containing a called line, and means whereby if the latter said group of trunk links is found busy when progressing the call a re-progression of the call will be automatically made without special directive control from the dial involving a trunk group other than the said busy group whereby the call will be progressed to the said office.

67. In an automatic telephone system, calling and called lines, trunk links in groups, a linking switch terminating each trunk link, a calling dial on the calling line for transmitting series of directive impulses for directively causing a connection to be linked from the calling line to an office containing a called line employing a trunk link of each of a plurality of said groups, and means whereby if a said group is encountered wherein all the trunks thereof are busy the progressed extension of the call will become automatically effaced and a new progression of the call will become automatically initiated to re-progress the call in the direction of the said office, the said re-progression of the call involving trunk groups other than the one having all trunks busy when encountered, the said re-progression of the call being without specific dial operation.

68. In an automatic telephone system, calling and called lines, linking switches terminating trunk links in groups, a calling dial on the calling line, the said dial for directively controlling the linking of a connection from a calling line through certain of said groups to a called line, a storing device for receiving the directive impulses sent from the dial and for then re-transmitting them effective to the said switches for linking the connection, and means in the storing device automatically operative if a connection cannot be completed due to a busy trunk condition for effacing the progressed connection and then automatically reprogressing the connection to the called line avoiding the group of trunks presenting the busy condition without the party operating the dial being aware of the reprogression.

69. In an automatic telephone system, calling and called lines, a plurality of trunk routes between a said calling and called line, a dial on the calling line for directively extending a call over a first one of said trunk routes to the called line, and automatic means whereby if the call cannot be completed over said first route due to a busy trunk condition the call extension will be automatically effaced and then automatically re-extended over a second of said routes in the direction of the called line.

70. In an automatic telephone system, calling and called lines, an attendant's station, a dial on the calling line for directively extending a call from the calling line to the called line, and automatic means effective if the said call cannot be completed due to a busy condition being encountered to efface the extension and re-extend the connection from the calling line to the attendant's station without specific dial operation.

71. In a telephone system, calling and called lines, a directive calling device on the calling line, directive switches, a first one of said directive switches being attained consequent to the initiation of the call on the calling line, a storing mechanism associated with the calling line for receiving and storing a train of series of directive impulses sent from the said calling line whereby the said storing mechanism will resend impulses to control the directive switches to extend the call to the called line, and means whereby sending either of two trains of series of impulses from the calling line will set up a condition in the storing mechanism whereby the storing mechanism will send the same train of impulses to progress the call to the called line regardless of which series had been sent from the calling line.

72. In a telephone system, a calling line and a called line, automatic directive switches of different numerical orders, a single set of connecting terminals for the called line accessible from a said switch, a directive impulse calling device on the calling line, a storing mechanism associated with the calling line responsive to the calling device for storing the train of series of impulses sent from the calling device and resending the said stored train effective to the directive switches to extend the call from the calling line to the called line, and means to extend the call from the said calling to the said terminals of said called line responsive to different impulse trains stored and resent by the storing mechanism.

73. In a telephone system, a calling line and a called line, automatic directive switches of different numerical orders, a single set of connecting terminals for the calling line accessible from the said switch, a directive impulse calling device on the calling line, a storing mechanism associated with the calling line responsive to the calling device for storing the train of series of impulses sent from the calling device and resending the said train effective to the directive switches to extend the call from the calling line to the called line, and means for sending different trains of impulse series effective to the storing mechanism to cause the said storing mechanism to send trains of impulse series which are alike effective of impulse series which are alike effective to the said directive switches to extend a call from the said calling to the said called line.

74. In a telephone system, a calling and a called line, a directive calling device on the calling line, directive switches, a storing mechanism associated with the calling line for receiving and storing a train of series of directive impulses sent from the said calling line for thereupon causing the directive switches to operate to extend the call from the calling line to the called line, and means whereby sending any one of a plurality of impulses from the calling line will cause like operation of the said switches in effecting the completion of a call between said lines.

75. In a telephone system, a calling and a called line, a directive calling device on the calling line, directive switches, a storing mechanism associated with the calling line for receiving and storing a train of series of directive impulses sent from the said calling device for thereupon causing the directive switches to operate to extend the call from the calling line to the called line, and means whereby sending either of two different trains of series of impulses from the calling device will cause like operation of said switches in effecting the completion of a call between said lines.

76. In a telephone exchange system, a calling subscriber's line, a selector switch for extending a connection from said line, a register sender for controlling said switch, means associated with said calling line for setting the registers in said sender, a time measuring device and means controlled by said time measuring device to set up a special registration on said sender.

77. In a telephone exchange system, a calling subscriber's line, a selector switch for extending a connection from said line, a register sender for controlling said switch, a sending dial associated with said calling line for setting the registers of said sender, and means automatically operated to set said sender upon the failure of the calling subscriber to dial the desired number.

78. In a telephone exchange system, a calling subscriber's line, selector switches for extending a connection from said line, a register sender for controlling said switches, means associated with said calling line to set the registers of said sender, a trunk circuit, and means automatically operated, upon the delayed setting of said registers by the calling subscriber, to set said sender and to control the extension of said calling line to said trunk circuit.

79. In a telephone exchange system, a calling subscriber's line, selector switches for extending a connection from said line, a register sender for controlling said switches, means associated with said calling line for setting the registers of said sender, a trunk circuit, an operator's position, a signalling device associated with said operator's position, means automatically operated upon the delayed setting of said registers to give said sender a special setting and to control the extension of said calling line to said trunk circuit, and means to operate said signal upon the extension of said calling line to said trunk circuit.

80. In a telephone exchange system, a calling subscriber's line, selector switches for extending a connection from said line, a register sender for controlling said switches, means associated with said calling line for setting the registers of said sender, a trunk circuit, an operator's position, a signalling device associated with said operator's position, means automatically operated upon the delayed setting of said registers to give said sender a special setting and to control the extension of said calling line to said trunk circuit, and means effective upon the response of said operator to said signalling device to associate said operator's talking circuit with said calling line.

81. In a telephone exchange system, a calling subscriber's line, a sending dial associated with said calling line, a sender, means in said sender to respond to an initiated call, means in said sender to respond to said sending dial, and means automatically operated to release said sender upon the failure of the calling subscriber to dial a number.

82. In a telephone exchange system, a calling subscriber's line, a trunk circuit, a selector switch, a register sender for controlling said switch, means associated with said calling line for setting the registers of said sender, a time measuring device, means controlled by said time measuring device to set up a special registration on said sender, means to operate said selector switch in accordance with said special registration to establish connection from said calling line to said trunk, and means to restore said sender to its normal condition.

83. In a telephone exchange system, a calling subscriber's line, a trunk circuit, a selector switch, a plurality of register senders, means to extend said calling line to said selector switch, means to associate an idle register sender with said selector switch, means associated with said calling line for setting the registers of said associated sender, a time measuring device, means controlled by said time measuring device to set up a special registration on said sender, means to operate said selector switch in accordance with said special registration to establish connection from said calling line to said trunk circuit, and means to release said sender.

84. In a telephone exchange system, a calling line, selector switches for extending a connection from said calling line, a registering mechanism for controlling said switches, said mechanism comprising a primary register and a plurality of secondary registers, means under the control of the calling subscriber for setting said registers to record digits of the designation of a desired connection, and means whereby any one of said secondary registers may be selected directly through the operation of said primary register.

85. In a telephone exchange system, a calling line, selector switches for extending a connection from said calling line, a registering mechanism for controlling said switches, said mechanism comprising a primary register and a plurality of secondary registers, means under the control of the calling subscriber for setting said registers to record digits of the designation of a desired connection, and means whereby any one of said secondary registers may be directly selected in response to the operation of said primary register upon the dialling of the first digit of the designation and whereby said selected secondary register is thereupon operated in response to the second digit dialled.

86. In a telephone exchange system, a calling line, selector switches for extending a connection from said calling line, a plurality of registering mechanisms for controlling said switches, means for selecting an idle one of said mechanisms, each of said mechanisms comprising a primary and a plurality of secondary registers, means under the control of the calling subscriber for setting said registers to record digits of the designation of a desired connection, and means whereby any one of said secondary registers may be directly selected through the operation of said primary register.

87. In a telephone exchange system, a calling line, a link circuit and selector switches for extending a connection from said calling line, a plurality of registering mechanisms, each comprising a primary and a plurality of secondary registers, means for associating an idle registering mechanism with said link circuit, means under the control of the calling subscriber for setting said registers to record digits of the designation of a desired connection, and means whereby any one of said secondary registers may be directly selected through the operation of said primary register.

88. In a telephone exchange system, calling line, selector switches for extending a connection from said calling line, a registering mechanism for controlling said switches, said mechanism comprising a primary register, a plurality of secondary registers and an impulse controlling device, means under the control of the calling subscriber for setting said registers to record digits of the designation of a desired connection, means whereby any one of said secondary registers may be selected through the operation of said primary register, and means for cross-connecting the terminals of said secondary registers with said impulse controlling device whereby the control of said switches by said device may be readily changed.

89. In a telephone exchange system, a calling line, selector switches for extending a connection from said calling line, a registering mechanism for controlling said switches, said mechanism comprising a primary register, a plurality of secondary registers and an impulse controlling device, means under the control of the calling subscriber for setting said registers to record digits of the designation of a desired connection, means whereby any one of said secondary registers may be selected through the operation of said primary registers, and a cross-connecting rack interposed between said registers and said impulse controlling device whereby the control of said switches by said device may be readily changed.

90. In a telephone exchange system, a calling line, selector switches for extending a connection from said calling line, a registering mechanism for controlling said switches, said mechanism comprising a primary register, a plurality of secondary registers and an impulse controlling device, means under the control of the calling subscriber for setting said registers to record digits of the designation of a desired connection, means whereby any one of said secondary registers may be selected through the operation of said primary register, means for curtailing the operation of said impulse controlling device if the designation recorded is such as to necessitate a lesser number of switching stages in the control of said switches than said mechanism is normally capable of, and a cross-connecting rack interposed between said last named means and said registers whereby the control of said means may be readily changed.

91. In a telephone exchange system, a calling line, a called office, a first selective switch, a second selective switch, a first group of trunks extending from said first selective switch, a second group of trunks extending between said second switch and said called office, a mechanism accessible in common to a plurality of selective switches for controlling the operation thereof, means under control of said mechanism for selecting a particular trunk in said first group of trunks and for testing the trunks of said second group of trunks, and means effective when all the trunks in said second group are busy for releasing said particular selected trunk and automatically selecting a different trunk in said first group of trunks.

92. In a telephone exchange system, a calling office, called offices, a first selective switch, a second selective switch, a plurality of groups of trunks extending from said first switch, another plurality of groups of trunks extending between said calling office and said called offices, means for selecting a trunk in a particular one of said first mentioned groups, means for testing all trunks in a particular one of said second groups, and means effective when all the trunks of the latter group are busy for releasing the first selected trunk and for selecting a second trunk in a different one of said first plurality of groups of trunks.

93. In a telephone exchange system, a calling office, called offices, a first selective switch, a second selective switch, a plurality of groups of trunks bearing certain numerical designations and extending from said first switch, each group bearing a different numerical designation, another plurality of groups of trunks extending between said calling office and said called offices, means for selecting a trunk in a particular one of said first mentioned groups, means for testing all the trunks in a particular one of said second mentioned groups, and means effective when all the trunks of the latter group are busy for releasing the first selected trunk and for selecting a trunk bearing a different numerical designation in another of said first plurality of groups of trunks.

94. In an automatic telephone system, a calling line, a register sender, step-by-step switches controlled thereby, an impulse sender in said line, a translating switch included in said register sender, means to position said translating switch under control of the impulse sender, and means for controlling said register sender to transmit a number of sets of impulses to said step-by-step switches in accordance with the setting of said translating switch.

95. In an automatic telephone system, a register sender, step-by-step switches controlled thereby, an impulse sender, a translating switch included in said register sender, means to position said translating switch in accordance with a number of sets of impulses produced by said impulse sender, and means for causing said register sender to transmit a different number of sets of impulses to said step-by-step switches in accordance with the setting of said translating switch.

96. In an automatic telephone system, a register sender, step-by-step switches controlled thereby, an impulse sender, a translating switch included in said register sender, means to position said translating switch in accordance with a number of sets of impulses produced by said impulse sender, and means for causing said register sender to transmit a greater number of sets of impulses to said step-by-step switches in accordance with the setting of said translating switch.

97. In an automatic telephone system, a register sender, step-by-step switches controlled thereby, an impulse sender, a translating switch included in said register sender, means to position said translating switch under control of said impulse sender, and means for causing said register sender to transmit a less number of sets of impulses to said step-by-step switches in accordance with the setting of said translating switch.

98. In an automatic telephone system, a register sender, step-by-step switches controlled thereby, an impulse sender, a translating switch included in said register sender, means to position said translating switch in accordance with a number of sets of impulses produced by the impulse sender, and means for causing said register sender to transmit a different number of different sets of impulses to said step-by-step switches in accordance with the setting of said translating switch.

99. In an automatic telephone system, a register sender, step-by-step switches controlled thereby, an impulse sender, a translating switch included in said register sender, means to position said translating switch under control of said impulse sender, and means for causing said register sender to transmit a greater or less number of sets of impulses to said step-by-step switches in accordance with the setting of said translating switch.

100. In an automatic telephone system, a register sender, step-by-step switches controlled thereby, an impulse sender, a translating switch included in said register sender, means to position said translating switch in accordance with a number of sets of impulses produced by the impulse sender, and means for causing said register sender to transmit a number of sets of impulses to said step-by-step switches, such number being arbitrary and determined solely by the set position of the translating switch.

101. In an automatic telephone system, a register sender, step-by-step switches controlled thereby, an impulse sender, a translating switch included in said register sender, means to position said translating switch in accordance with a number of sets of impulses produced by the impulse sender, and means for controlling said register sender to transmit a number of sets of impulses to said step-by-step switches, such number of sets and the number of impulses in each set being arbitrary and determined solely by the set position of the translating switch.

102. In an automatic telephone system, a register sender, step-by-step switches controlled thereby, an impulse sender, a translating switch having a plurality of separate directed movements included in said register sender, means to position said translating switch in accordance with a number of sets of impulses produced by the impulse sender, and means for controlling said register sender to transmit a different number of sets of impulses to said step-by-step switches in accordance with the setting of said translating switch.

103. In an automatic telephone system, a register sender, step-by-step switches controlled thereby, an up-and-around translating switch included in said register sender, means for positioning said translating switch in its vertical and rotary directions in accordance with a number of sets of impulses, and means for controlling said register sender to transmit a number of sets of impulses to said step-by-step switches in accordance with the setting of said translating switch.

104. In an automatic telephone system, a calling line, a register sender, step-by-step switches controlled thereby, an impulse sender in said line, a translating switch included in said register sender, means to position said translating switch under control of said impulse sender, and a counting device for cooperating with said translating switch to transmit a number of sets of impulses to said step-by-step switches in accordance with the setting of said translating switch.

105. In an automatic telephone system, telephone lines, step-by-step switches, a register sender, a translating switch included in said register sender, means for automatically associating a calling line with said register sender, an impulse sender associated with said line to set said translating switch, and means for causing said register sender to transmit sets of impulses to said switches in accordance with the setting of said translating switch.

106. In an automatic telephone system, telephone lines, a plurality of offices wherein said lines terminate, automatic step-by-step switches, register senders at each office, means for automatically associating the calling line with an idle register sender in the originating office, an impulse sender associated with said calling line for setting said register sender according to a given number of sets of impulses, means for causing said register sender to transmit a modified number of sets of impulses in accordance with the setting of said register sender to switches in the proper offices in tandem to route the call to the office wherein the called line terminates, and to transmit impulses to the switches at said office to properly set the same to select the desired line.

107. In an automatic telephone system, telephone lines, a plurality of offices wherein said lines terminate, automatic step by step switches, register senders at each office, means for automatically associating the calling line with an idle register sender in the originating office, an impulse sender associated with said calling line for setting said register sender according to a given number of sets of impulses, means for causing said register sender to transmit a greater number of sets of impulses in accordance with the setting of said register sender to switches in the proper offices in tandem to route the call to the office wherein the called line terminates, and to transmit impulses to the switches at said office to properly set the same to select the desired line.

108. In an automatic telephone system, telephone lines, a plurality of offices wherein said lines terminate, automatic step-by-step switches, register senders at each office, each register sender comprising a number of banks of terminals and brush sets and primary and secondary stepping magnets, means for automatically associating a calling line with an idle register sender, an impulse sender associated with said calling line for setting said register sender according to a given number of sets of impulses, means for causing said register sender to transmit a modified number of sets of impulses to switches in the proper offices in tandem to route the call to the office wherein the called line terminates, and to transmit additional sets of impulses to the switches at said office to properly set the same to select the desired line.

109. In an automatic telephone system, telephone lines, a plurality of offices wherein said lines terminate, automatic step-by-step switches, register senders at each office, each register sender comprising a number of banks of terminals and brush sets and primary and secondary stepping magnets, means for automatically associating a calling line with an idle register sender, an impulse sender associated with said calling line for setting said register sender according to a given number of sets of impulses, means for causing said register sender to transmit a greater number of sets of impulses to switches in the proper offices in tandem to route the call to the office wherein the called line terminates, and to transmit additional sets of impulses to the switches at said office to properly set the same to select the desired line.

110. In an automatic telephone system, telephone lines, a plurality of offices wherein said lines terminate, automatic step-by-step switches, register senders at each office, each register sender comprising a number of banks of terminals and brush sets and primary and secondary stepping magnets, means for automatically associating a calling line with an idle register sender, an impulse sender associated with said calling line for setting said register sender according to a given number of sets of impulses, means for causing said register sender to transmit a less number of sets of impulses to route the call over switches in the originating office and to transmit additional sets of impulses to switches thereat to properly set the same to select the desired line.

111. In an automatic telephone system, telephone lines, a plurality of offices wherein said lines terminate, automatic step-by-step switches, register senders at each office, each register sender comprising a number of banks of terminals and brush sets and primary and secondary stepping magnets, means for automatically associating a calling line with an idle register sender, an impulse sender associated with said calling line for setting said register sender according to a given number of sets of impulses, means for causing said register sender to transmit a greater or less number of sets of impulses to the switches to properly route the call to the office wherein the called line terminates, and to transmit additional sets of impulses to switches at said office to properly set the same to select the desired line.

112. In a switch controller, a relay, an impulse sender, means for operating said sender to transmit a plurality of series of impulses corresponding to all the digits in a telephone number, and circuits controlled by said relay for determining the number of impulses in each series.

113. In a telephone system, a control circuit, automatic switches, a sender for interrupting said control circuit to control said switches, a plurality of devices, and means for operating said sender to set all said switches responsive to a single actuation of a single device.

114. In a switch controller, a relay, an impulse sender, means for operating said sender to transmit a plurality of series of impulses corresponding to all the digits in a telephone number, and circuits controlled by said relay for determining the number of series and the number of impulses in each series.

115. In a multi-office telephone system, a sender for transmitting different pluralities of digits corresponding to office codes, a switch for controlling the sender in transmitting the digits, said switch having a plurality of code digit positions, a plurality of said code digit positions being normally effective to control the sender in transmitting the digits of certain office codes, the remaining of said code digit positions being ineffective to control said sender whereby said switch skips such positions, and means operative under predetermined conditions for rendering said remaining code digit positions effective to control said sender in transmitting certain other office codes.

116. In a multi-office telephone system, a sender for transmitting different pluralities of digits corresponding to office codes, a switch for controlling the sender in transmitting the digits, said switch having a plurality of code digit positions, a plurality of said code digit positions being normally effective to control the sender in transmitting the digits of certain office codes, the remaining of said code digit positions being ineffective to control said sender whereby said switch skips such positions, and means for rendering a portion of said remaining code digit positions effective to control said sender in transmitting certain other office codes.

117. In a register sender system in which sending apparatus is provided to retransmit digits in accordance with the setting of registering devices which are provided with wipers and cooperating bank contacts; means controlled through a wiper of one of said registers for starting said sender to retransmitting digits under the control of the registers.

118. In a register sender, a plurality of registers each provided with a wiper and bank of contacts, a sender for transmitting series of impulses, and means controlled through a wiper of one of said registers for starting said sender.

119. In an automatic telephone system, a series of switches for connecting a calling line with another line, a control circuit, impulse sending mechanism for transmitting a plurality of series of impulses over said control circuit to operate said switches in succession, means for stopping said sending mechanism after each series of impulses has been transmitted, means independent of said sending mechanism for producing a change in said control circuit after each switch has operated, and means responsive to such changes for restarting said sending mechanism.

120. In a call director, means for registering the digits in a number, said means including a plurality of members which are actuated simultaneously when a single digit is registered, a sending device controlled by means of said members, means for rendering said members separately effective to control said device, and means for operating said sending device independent of control by one of said members if a particular number is called.

121. In a call director, apparatus for registering a digit in a number, said apparatus comprising a plurality of parts all of which are set responsive to said digit, a sending device, connections from the several parts of said apparatus to said sending device for controlling said device, and means for facilitating the shifting of the connections to change the control.

122. In a telephone system, a train of automatic directive switches for setting up a connection, a non-directive hunting switch inserted in said switch train between two of said directive switches, a register sender for transmitting series of impulses to set said directive switches, means for delaying the transmission of impulses for operating each switch except the first in order to provide time for the preceding switch to complete its operation, and means for causing a longer delay before the transmission of the impulses for operating the switch immediately following said hunting switch.

123. In a telephone system, a train of automatic directive switches for setting up a connection, a register sender for transmitting spaced series of impulses to set said switches, a non-directive hunting switch inserted in said switch train between two of said directive switches, and means for producing an extra long space just before the transmission of the impulses for operating the directive switch immediately following said hunting switch.

124. In a telephone system, a train of automatic switches for setting up a connection, said train including both directive and non-directive switches, a director for controlling said switches successively, each switch operating to extend the connection to the next switch, and an impulse sender in said director responsive only when the connection is extended to a directive switch.

125. In a telephone system, a train of automatic switches for setting up a connection, said train including both directive and non-directive switches, a director for controlling said switches successively, each switch operating to extend the connection to the next switch, a sender in said director normally effective each time the connection is extended to another switch to transmit a series of impulses, and means for rendering said sender ineffective when the connection is extended to a non-directive switch.

126. In a telephone system, a trunk line for use in connecting a calling and called line, a register sender and means for connecting it with said trunk line, a reversing relay controlled from said register sender for transposing the conductors of said trunk line, and a relay between the calling line and said reversing relay responsive to a reversal of current in said trunk line.

127. In a telephone system, a trunk line, a director and means for connecting it to said trunk line, a train of switches controlled by said director for extending said trunk line, circuit connections in the switch train such that the trunk conductors are reversed with respect to the battery supply when the extension is completed, and a reversing relay in said trunk line controlled from the director for reversing said trunk conductors back to normal.

128. In a register sender, a relay energized responsive to the registration of a number, a plurality of sets of contacts operated by said relay, a sender, and means for rendering said contact sets successively effective to control said sender.

129. In a director, a plurality of registers, a sender, means for causing said registers to control said sender when certain numbers are registered thereon, a relay adapted to exercise a similar control over said sender, and means for energizing said relay when a particular other number is registered.

130. In a director, registers, a sender, a sequence switch for placing said sender under the control of said registers in turn, a motor magnet for said sequence switch, a circuit for said magnet controlled by said sender, and another circuit for said magnet controlled jointly by said sequence switch and by one of said registers.

131. In a director, an office register having a plurality of wipers, a sender, a sequence switch for placing said sender under the control of said wipers in turn, a motor magnet for said sequence switch, a circuit for said magnet controlled by said sender, and another circuit for said magnet controlled by one of said wipers.

132. In a director, registering means comprising a plurality of devices each for determining a digit in an office code, a sender, means for causing said sender to be controlled by said devices in turn for the purpose of transmitting code digits, and means for skipping a code digit by rendering one of said devices ineffective to control said sender.

133. In a director, a plurality of code digit selecting devices, means for operating said devices simultaneously responsive to the registration of a number, a sender, means for operating said sender to transmit all the digits selected by said devices one after another in case a certain number has been registered, and means for causing the sender to omit one or more digits in case another number has been registered.

134. In a director, an office register for selecting office codes, a wiper on said register for each code digit, a sequence switch having a different position for each code digit, and a circuit through the wiper corresponding to a missing digit in a short code for advancing said sequence switch through the position corresponding to such digit.

135. In a register sender, a distributing frame, a set of terminals on one side of said frame adapted to be selected by the registration of a number, digit bus-bars and a "skip" bus-bar on the other side of said frame, and jumpers connecting one terminal of said set to a digit bus-bar and another terminal of said set to said "skip" bus-bar.

136. In a director, means for transmitting office codes each consisting of one or more digits, a sequence switch having as many code positions as there are digits in the longest code, and means effective when a short code is transmitted for causing the said sequence switch to automatically pass through a code position corresponding to a missing digit.

137. In a director, registering apparatus, a sender controlled by said apparatus, and means responsive to the registration of a single digit for causing said sender to transmit a plurality of digits independent of further adjustment of said registering apparatus.

138. In a director, a register, a sender controlled by said register, means for setting said register in accordance with a plurality of digits, and means responsive to the setting of said register for causing said sender to transmit an equal or a greater plurality of digits, the number of digits transmitted depending on the set position of said register.

139. In a telephone system, a line, a line relay connected to said line, a finder switch, a start circuit for said finder completed responsive to the energization of said line relay, whereby said finder is caused to hunt for and connect with said line, and a relay individual to said line controlled by said finder when it connects with the line to render said start circuit ineffective while the said line relay remains connected to said line.

140. In a telephone system, a line, a finder switch, means responsive to a call for causing said finder to hunt for and connect with said line, a holding circuit for maintaining said finder in connective position, and means individual to said line for maintaining said holding circuit closed.

141. In a register sender, a plurality of registers, a sender starting circuit, a branch of said circuit for each register, a sequence switch for connecting said circuit to said branches in turn, and means in each register for closing its associated branch.

142. In a register sender, a plurality of registers adapted to be successively set in accordance with digits in a called number, a sender, means for associating said sender with said registers successively to transmit series of impulses corresponding to the digits registered thereon, means for preventing the operation of said sender in case it becomes associated with a register which has not been set, and means for automatically starting said sender when the register with which it is associated is set.

143. In a telephone system, a trunk line extending to an automatic switch, a director, means for connecting said director to said trunk line to register the number of a called line, a control circuit over which said director delivers operating impulses to said switch, said circuit being normally open, and means in said director responsive to the partial registration of a number for closing said circuit.

144. In a telephone system, a trunk line extending to an automatic switch, a director, means for connecting said director to said trunk line to register the number of a called line, a control circuit over which said director delivers operating impulses to said switch, said circuit being normally open, and a relay in said director controlled by the registering portion thereof to close said circuit.

145. In a telephone system, a train of switches comprising selectors and a connector, a director for transmitting spaced series of impulses to said switches, one series being transmitted to each selector and two series being transmitted to said connector, means for regulating the spacing between successive series of selector impulses according to the hunting time of the selectors, and means for cutting out the regulating means so it is ineffective to control the spacing between the two series of impulses sent to the connector.

146. In a telephone system, a switch train comprising switches of two classes, a director for transmitting spaced series of impulses to operate said switches, means for regulating the spacing in accordance with an operating characteristic of one class of switch while such switches are being operated, and means for rendering said regulating means ineffective as soon as all the switches of the one class are operated so that it does not affect the spacing during the operation of a switch of the other class.

147. In a telephone system, a train of serially related automatic trunk hunting switches, an impulse sender for transmitting series of impulses, one series for each of said switches, to operate such switches to select trunk groups, means controlled by each of said switches when an idle trunk leading to the next succeeding switch is found for transmitting an electrical impulse back to said sender, and means in said sender controlled by said electrical impulse for starting said sender to transmit the next series of impulses.

148. In a telephone system, a train of serially related automatic trunk hunting switches and a connector switch accessible to the last of said trunk hunting switches, a sender for transmitting a series of impulses for each of said trunk hunting switches and two series of impulses for said connector switch to operate said switches, means in said impulse sender revertively controlled from said switches for starting said sender to transmit each of the series of impulses after the first and including the next to the last series, whereby the various series of impulses named are sufficiently spaced apart, and locally controlled timing means in said sender for spacing the last two series of impulses apart.

149. In a call director, a digit register having two wipers, means controlled through the first of these wipers for transmitting a desired predetermined series of impulses, and controlled subsequently through the second wiper for transmitting a second desired predetermined series of impulses, and means effective in a particular position of said wipers for rendering one wiper ineffective to control said impulse-transmitting means.

150. In a director system, a register switch having a plurality of wipers, means responsive to a digit in a telephone number for selecting said register switch, means for operating said register to register another digit in a telephone number, and means effective thereafter and controlled through said wipers, respectively, for transmitting a like plurality of series of impulses.

151. In a telephone system, a call director, a plurality of registers in said director each corresponding to a different digit, means for connecting said director to a calling line, and means responsive to impulses representing the first digit in a telephone number for selecting the one of said registers corresponding to such digit.

152. In a telephone system, a call director, a plurality of two-digit register switches in said director, a single-digit register switch, means for connecting said director to a calling line, and means for operating the single-digit register switch in accordance with a digit in a telephone number to select the one of said two-digit registers corresponding to the digit registering by the single-digit register.

153. In a call director, a digit register, a plurality of other digit registers, and means for operating the first named digit register to register a desired digit by selecting the corresponding one of said other digit registers.

154. In a multi-office telephone system, means for registering any desired subscriber's number, means for translating the portion of such registered number that is indicative of the desired office, and means for transmitting impulses representing the translated portion of the number and for transmitting impulses representing the remaining untranslated portion of the registered number.

155. In a multi-office automatic telephone system, means for registering any desired subscriber's number, means for translating such portion of the registered number as is indicative of the office of the desired subscriber, and means for transmitting to the automatic switches impulses representing the said translated portion of such number and for transmitting to the automatic switches impulses representing the remaining portion of the desired number.

156. In a multi-office telephone system, means for transmitting a plurality of series of impulses representing the number of a desired subscriber, means for registering all said impulses, means for translating such of said impulses as are indicative of the called office in accordance with the trunking arrangement necessary to reach the desired office, means including a single impulse sender for transmitting the said translated impulses and for retransmitting the remaining portion of the registered number, and a train of automatic switches directly responsive to the impulses transmitted by said sender to complete a connection to the called line.

157. In a call director, an office register having a plurality of different settings each corresponding to a different office, sending means associated with said register, means for operating said sending means under the control of said register in any one of its several positions to transmit a plurality of series of impulses, means whereby the value of the series of impulses corresponding to any particular position of said register may be readily changed, and automatic switching mechanism responsive to said impulses to extend a telephone connection.

158. In a call director, an office register having a plurality of different settings each corresponding to a different office, sending means associated with said register, means for operating said sending means under the control of said register in any one of its several positions to transmit a series of impulses, a distributing frame at which the value of such series of impulses may be assigned at will, and automatic switching mechanism responsive to the transmitted series of impulses to set up a link in a telephone connection.

159. In combination, a register having a plurality of different settings, sending means associated with said register, means for operating said sending means under the control of said register in any one of its several positions to transmit a plurality of series of impulses, means whereby the value of the series of impulses corresponding to any particular position of said register may be readily changed, and a plurality of automatic switches responsive to said impulse series respectively.

160. In an automatic telephone system, a register having a plurality of different settings, sending means associated with said register, means for operating said sending means under the control of said register in any one of its several positions to transmit a series of impulses to the automatic switches, and a distributing frame at which the value of such series of impulses may be assigned at will.

161. In a call director, a plurality of registers each corresponding to a different digit, means responsive to impulses representing a digit in a telephone number for selecting the one of said registers corresponding to such digit, means responsive to impulses representing another part of the same telephone number for operating the selected register, and an impulse sender controlled in accordance with the set position of any selected register.

162. In a director system, a first register switch having a wiper, a plurality of other register switches, means for operating said first register switch in accordance with a digit in a telephone number, means for selectively operating the one of said other switches corresponding to such digit through said wiper, a sender controlled by the operated one of said other switches, and a plurality of automatic trunking switches controlled by said sender.

163. In a call director, a first register switch having wipers, a plurality of other register switches, means for operating said first register switch in accordance with a digit in a telephone number, means for operating the one of said other switches corresponding to such digit through one of said wipers, another register switch, and means for operating the last named register switch to register a further part of the same number over a circuit path excluding said wipers.

164. In an impulse sender for transmitting a plurality of series of impulses, a circuit over which said impulses are transmitted, means in the sender controlled revertively over said circuit for spacing apart all of the series of impulses except the last two, and means in said sender independent of control over said circuit for controlling the spacing apart of only the last two series of impulses.

165. In combination, an impulse sender for transmitting series of impulses, a circuit over which said impulses are transmitted, means in said sender for spacing said impulse series apart from each other, means outside of said sender for controlling said spacing means over the impulse circuit to space only certain ones of said impulse series from each other, and means in said sender for controlling said spacing means to space only the remaining impulse series from each other.

166. In a multi-office automatic telephone system, a director, means in said director for registering a telephone number, an impulse conductor outgoing from said director, means for translating such portion of said number as is indicative of the called office in accordance with the trunking arrangement necessary to reach the desired office, an impulse sender in said director, and means for operating said sender to transmit impulses over said impulse conductor to the automatic switches representing the translated portion of said number and for retransmitting impulses representing the remaining portion of the registered number.

167. In a telephone system, a director including registering, translating, and sending apparatus, a conductor incoming to said director, a conductor outgoing from said director, means controlled over the incoming conductor for setting the registering portion of the director in accordance with a telephone number, and means for operating the sending portion of said director to transmit impulses over the outgoing conductor in accordance with the translated equivalent of the registered number.

168. In a call director including an office register and a sender, said office register having a plurality of different settings each corresponding to a different office, an input conductor leading into said director, an output conductor leading out of said director, means for setting said office register over said input conductor into a position corresponding to any desired office, means for operating the sender under the control of the office register in any one of its set positions to transmit a plurality of series of impulses over said output conductor, and means whereby the value of the series of impulses corresponding to any particular position of said register may be readily changed.

169. In a call director, a plurality of registers each corresponding to a different digit, a circuit outgoing from said director, means responsive to impulses representing a digit in a telephone number for selecting the one of said registers corresponding to such digit, means for operating any selected one of said registers in accordance with a further portion of said telephone number, and means for transmitting impulses over said circuit in accordance with the set position of any operated one of said registers.

170. In a telephone system, a trunk line, means for extending a calling line to said trunk line, a switch temporarily in branch relation to said trunk line operated responsive to the first digit of the called number, a second switch selected by said first switch and operated responsive to the next digit of the called number, a sender controlled by said second switch in operated position, and a train of switches controlled by said sender to extend said trunk line.

171. In a multi-office telephone trunking system, office selectors in one exchange, trunk lines extending from the banks of said office selectors to other office selectors in the same exchange, trunk lines extending from the banks of said first-mentioned office selectors to secondary line switches, and outgoing trunk lines extending from the banks of said line switches to another exchange.

172. In a multi-office telephone trunking system, an exchange, two groups of inter-office trunk lines extending from said exchange to two other exchanges, respectively, a group of office selectors in said first exchange for performing the final numerical operation in selecting one of said groups of trunk lines, and another group of office selectors in said first exchange for performing the final numerical operation in selecting said first group of office selectors and also in selecting the other of said groups of trunk lines.

173. In a telephone trunking system, a tandem office, trunks incoming to said tandem office and terminating in thousands selectors, groups of local hundreds selectors accessible to said thousands selectors, and a group of inter-office trunk lines accessible to said thousands selectors and extending to another main exchange.

174. In a telephone trunking system, a tandem office, trunks incoming to said tandem office and terminating in thousands selectors, groups of local hundreds selectors accessible to said thousands selectors, a group of office selectors accessible to said thousands selectors, and groups of inter-office trunk lines accessible to said office selectors.

175. In a multi-office telephone trunking system, subscribers' lines having telephone numbers each consisting of an office designation and a line designation, a group of selectors in one office of the system, and means for operating one of said selectors at one time in accordance with a digit derived from the office designation of a line and at another time in accordance with a digit in the line designation of a line.

In witness whereof, I hereunto subscribe my name this first day of August, A. D. 1928.

RODNEY G. RICHARDSON.

In witness whereof, I hereunto subscribe my name this first day of August, A. D. 1928.

MARTIN L. NELSON.